United States Patent
Besehanic

(10) Patent No.: US 9,209,978 B2
(45) Date of Patent: Dec. 8, 2015

(54) METHODS AND APPARATUS TO MEASURE EXPOSURE TO STREAMING MEDIA

(75) Inventor: Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 9 days.

(21) Appl. No.: 13/472,170

(22) Filed: May 15, 2012

(65) Prior Publication Data

US 2013/0311776 A1    Nov. 21, 2013

(51) Int. Cl.
| | | |
|---|---|---|
| H04L 9/32 | (2006.01) |
| H04L 9/28 | (2006.01) |
| G06F 15/16 | (2006.01) |
| H04L 9/08 | (2006.01) |
| H04L 9/12 | (2006.01) |
| H04L 29/06 | (2006.01) |
| H04N 21/2343 | (2011.01) |
| H04N 21/84 | (2011.01) |

(52) U.S. Cl.
CPC ............ *H04L 9/3247* (2013.01); *H04L 9/0869* (2013.01); *H04L 9/0894* (2013.01); *H04L 9/12* (2013.01); *H04L 63/0428* (2013.01); *H04L 63/062* (2013.01); *H04N 21/234309* (2013.01); *H04N 21/84* (2013.01)

(58) Field of Classification Search
USPC ................................ 726/26–27; 173/168, 176
See application file for complete search history.

(56) References Cited

U.S. PATENT DOCUMENTS

| | | | |
|---|---|---|---|
| 4,230,990 A | 10/1980 | Lert, Jr. et al. |
| 4,647,974 A | 3/1987 | Butler et al. |
| 4,677,466 A | 6/1987 | Lert, Jr. et al. |
| 4,697,209 A | 9/1987 | Kiewit et al. |
| 4,745,468 A | 5/1988 | Von Kohorn |
| 4,876,592 A | 10/1989 | Von Kohorn |
| 4,876,736 A | 10/1989 | Kiewit |
| 4,926,255 A | 5/1990 | Von Kohorn |
| 4,973,952 A | 11/1990 | Malec et al. |
| 5,019,899 A | 5/1991 | Boles et al. |
| 5,023,929 A | 6/1991 | Call |
| 5,034,807 A | 7/1991 | Von Kohorn |
| 5,057,915 A | 10/1991 | Von Kohorn |
| 5,081,680 A | 1/1992 | Bennett |

(Continued)

FOREIGN PATENT DOCUMENTS

| | | |
|---|---|---|
| AU | 8976601 | 2/2002 |
| AU | 9298201 | 4/2002 |

(Continued)

OTHER PUBLICATIONS

CIPO, "Office Action," issued in connection with Canadian Application Serial No. 2,574,998, mailed Aug. 26, 2008 (4 pages).

(Continued)

*Primary Examiner* — Amir Mehrmanesh

(74) *Attorney, Agent, or Firm* — Hanley, Flight & Zimmerman, LLC

(57) ABSTRACT

Methods and apparatus to measure exposure to streaming media are described. An example method includes identifying metadata from media. The media is converted into converted media having a streaming format. The converted media is encrypted using an encryption key. A manifest is created in association with the converted media, the manifest identifying a first location of the encrypted media and a second location of a decryption key.

34 Claims, 9 Drawing Sheets

(56) References Cited

U.S. PATENT DOCUMENTS

| | | |
|---|---|---|
| 5,128,752 A | 7/1992 | Von Kohorn |
| 5,227,874 A | 7/1993 | Von Kohorn |
| 5,249,044 A | 9/1993 | Von Kohorn |
| 5,283,734 A | 2/1994 | Von Kohorn |
| 5,331,544 A | 7/1994 | Lu et al. |
| 5,401,946 A | 3/1995 | Weinblatt |
| 5,425,100 A | 6/1995 | Thomas et al. |
| 5,481,294 A | 1/1996 | Thomas et al. |
| 5,512,933 A | 4/1996 | Wheatley et al. |
| 5,524,195 A | 6/1996 | Clanton, III et al. |
| 5,543,856 A | 8/1996 | Rosser et al. |
| 5,559,716 A | 9/1996 | Gaalswyk |
| 5,574,962 A | 11/1996 | Fardeau et al. |
| 5,579,124 A | 11/1996 | Aijala et al. |
| 5,594,934 A | 1/1997 | Lu et al. |
| 5,629,739 A | 5/1997 | Dougherty |
| 5,659,366 A | 8/1997 | Kerman |
| 5,666,293 A | 9/1997 | Metz et al. |
| 5,719,634 A | 2/1998 | Keery et al. |
| 5,734,413 A | 3/1998 | Lappington et al. |
| 5,740,035 A | 4/1998 | Cohen et al. |
| 5,815,671 A | 9/1998 | Morrison |
| 5,841,978 A | 11/1998 | Rhoads |
| 5,848,155 A | 12/1998 | Cox |
| 5,850,249 A | 12/1998 | Massetti et al. |
| 5,872,588 A | 2/1999 | Aras et al. |
| 5,880,789 A | 3/1999 | Inaba |
| 5,893,067 A | 4/1999 | Bender et al. |
| 5,910,987 A | 6/1999 | Ginter et al. |
| 5,918,223 A | 6/1999 | Blum et al. |
| 5,930,369 A | 7/1999 | Cox et al. |
| 5,933,789 A | 8/1999 | Byun et al. |
| 5,956,716 A | 9/1999 | Kenner et al. |
| 5,966,120 A | 10/1999 | Arazi et al. |
| 5,974,299 A | 10/1999 | Massetti |
| 5,974,396 A | 10/1999 | Anderson et al. |
| 5,987,855 A | 11/1999 | Dey et al. |
| 6,034,722 A | 3/2000 | Viney et al. |
| 6,049,830 A | 4/2000 | Saib |
| 6,055,573 A | 4/2000 | Gardenswartz et al. |
| 6,061,793 A | 5/2000 | Tewfik et al. |
| 6,088,659 A | 7/2000 | Kelley et al. |
| 6,108,637 A | 8/2000 | Blumenau |
| 6,115,654 A | 9/2000 | Eid et al. |
| 6,154,209 A | 11/2000 | Naughton et al. |
| 6,208,735 B1 | 3/2001 | Cox et al. |
| 6,216,129 B1 | 4/2001 | Eldering |
| 6,282,573 B1 | 8/2001 | Darago et al. |
| 6,286,036 B1 | 9/2001 | Rhoads |
| 6,286,140 B1 | 9/2001 | Ivanyi |
| 6,298,348 B1 | 10/2001 | Eldering |
| 6,308,327 B1 | 10/2001 | Liu et al. |
| 6,310,956 B1 | 10/2001 | Morito et al. |
| 6,331,876 B1 | 12/2001 | Koster et al. |
| 6,335,736 B1 | 1/2002 | Wagner et al. |
| 6,363,159 B1 | 3/2002 | Rhoads |
| 6,389,055 B1 | 5/2002 | August et al. |
| 6,400,827 B1 | 6/2002 | Rhoads |
| 6,411,725 B1 | 6/2002 | Rhoads |
| 6,421,445 B1 | 7/2002 | Jensen et al. |
| 6,442,285 B2 | 8/2002 | Rhoads et al. |
| 6,463,445 B1 | 10/2002 | Suzuki et al. |
| 6,487,564 B1 | 11/2002 | Asai et al. |
| 6,505,160 B1 | 1/2003 | Levy et al. |
| 6,512,836 B1 | 1/2003 | Xie et al. |
| 6,513,014 B1 | 1/2003 | Walker et al. |
| 6,522,771 B2 | 2/2003 | Rhoads |
| 6,539,095 B1 | 3/2003 | Rhoads |
| 6,546,556 B1 | 4/2003 | Kataika et al. |
| 6,553,178 B2 | 4/2003 | Abecassis |
| 6,642,966 B1 | 11/2003 | Limaye |
| 6,647,269 B2 | 11/2003 | Hendrey et al. |
| 6,651,253 B2 | 11/2003 | Dudkiewicz et al. |
| 6,654,480 B2 | 11/2003 | Rhoads |
| 6,665,873 B1 | 12/2003 | Van Gestel et al. |
| 6,671,732 B1 | 12/2003 | Weiner |
| 6,675,383 B1 | 1/2004 | Wheeler et al. |
| 6,683,966 B1 | 1/2004 | Tian et al. |
| 6,710,815 B1 | 3/2004 | Billmaier et al. |
| 6,714,683 B1 | 3/2004 | Tian et al. |
| 6,741,684 B2 | 5/2004 | Kaars |
| 6,750,985 B2 | 6/2004 | Rhoads |
| 6,766,523 B2 | 7/2004 | Herley |
| 6,795,972 B2 | 9/2004 | Rovira |
| 6,804,379 B2 | 10/2004 | Rhoads |
| 6,829,368 B2 | 12/2004 | Meyer et al. |
| 6,853,634 B1 | 2/2005 | Davies et al. |
| 6,871,323 B2 | 3/2005 | Wagner et al. |
| 6,873,688 B1 | 3/2005 | Aarnio |
| 6,941,275 B1 | 9/2005 | Swierczek |
| 6,956,575 B2 | 10/2005 | Nakazawa et al. |
| 6,968,315 B1 | 11/2005 | Nakisa |
| 6,968,564 B1 | 11/2005 | Srinivasan |
| 6,970,886 B1 | 11/2005 | Conwell et al. |
| 6,996,213 B1 | 2/2006 | De Jong |
| 7,003,731 B1 | 2/2006 | Rhoads et al. |
| 7,007,166 B1 | 2/2006 | Moskowitz et al. |
| 7,032,178 B1 | 4/2006 | McKnight et al. |
| 7,050,603 B2 | 5/2006 | Rhoads et al. |
| 7,051,086 B2 | 5/2006 | Rhoads et al. |
| 7,058,697 B2 | 6/2006 | Rhoads |
| 7,082,434 B2 | 7/2006 | Gosselin |
| 7,095,871 B2 | 8/2006 | Jones et al. |
| 7,143,949 B1 | 12/2006 | Hannigan |
| 7,158,943 B2 | 1/2007 | Van der Riet |
| 7,171,018 B2 | 1/2007 | Rhoads et al. |
| 7,174,293 B2 | 2/2007 | Kenyon et al. |
| 7,181,042 B2 | 2/2007 | Tian |
| 7,185,201 B2 | 2/2007 | Rhoads et al. |
| 7,194,752 B1 | 3/2007 | Kenyon et al. |
| 7,197,156 B1 | 3/2007 | Levy |
| 7,215,280 B1 | 5/2007 | Percy et al. |
| 7,221,405 B2 | 5/2007 | Basson et al. |
| 7,227,972 B2 | 6/2007 | Brundage et al. |
| 7,254,249 B2 | 8/2007 | Rhoads et al. |
| 7,273,978 B2 | 9/2007 | Uhle |
| 7,317,716 B1 | 1/2008 | Boni et al. |
| 7,328,153 B2 | 2/2008 | Wells et al. |
| 7,346,512 B2 | 3/2008 | Li-Chun Wang et al. |
| 7,356,700 B2 | 4/2008 | Noridomi et al. |
| 7,363,278 B2 | 4/2008 | Schmelzer et al. |
| 7,369,678 B2 | 5/2008 | Rhoads |
| 7,421,723 B2 | 9/2008 | Harkness et al. |
| 7,443,292 B2 | 10/2008 | Jensen et al. |
| 7,451,317 B2 | 11/2008 | Oh et al. |
| 7,463,143 B2 | 12/2008 | Forr et al. |
| 7,519,658 B1 | 4/2009 | Anglin et al. |
| 7,592,908 B2 | 9/2009 | Zhang et al. |
| 7,623,823 B2 | 11/2009 | Zito et al. |
| 7,643,090 B2 | 1/2010 | Ramaswamy et al. |
| 7,689,823 B2 | 3/2010 | Shen et al. |
| 7,712,114 B2 | 5/2010 | Ramaswamy |
| 7,827,312 B2 | 11/2010 | Ramaswamy et al. |
| 7,962,934 B1 | 6/2011 | Eldering et al. |
| 8,065,703 B2 | 11/2011 | Wilson et al. |
| 8,176,322 B2 | 5/2012 | Lee et al. |
| 8,179,475 B2 | 5/2012 | Sandrew |
| 8,578,272 B2 | 11/2013 | Pantos et al. |
| 8,706,685 B1 | 4/2014 | Smith et al. |
| 8,732,185 B1 | 5/2014 | Lynn et al. |
| 8,839,338 B2 | 9/2014 | Eyer |
| 8,856,869 B1 | 10/2014 | Brinskelle |
| 2001/0031066 A1 | 10/2001 | Meyer et al. |
| 2001/0044851 A1 | 11/2001 | Rothman et al. |
| 2001/0044899 A1 | 11/2001 | Levy |
| 2002/0012443 A1 | 1/2002 | Rhoads et al. |
| 2002/0016969 A1 | 2/2002 | Kimble |
| 2002/0032734 A1 | 3/2002 | Rhoads |
| 2002/0033842 A1 | 3/2002 | Zetts |
| 2002/0053078 A1 | 5/2002 | Holtz et al. |
| 2002/0056094 A1 | 5/2002 | Dureau |
| 2002/0059218 A1 | 5/2002 | August et al. |
| 2002/0062382 A1 | 5/2002 | Rhoads et al. |
| 2002/0069037 A1 | 6/2002 | Hendrickson et al. |

(56) References Cited

U.S. PATENT DOCUMENTS

| | | |
|---|---|---|
| 2002/0083324 A1 | 6/2002 | Hirai |
| 2002/0091991 A1 | 7/2002 | Castro |
| 2002/0102993 A1 | 8/2002 | Hendrey et al. |
| 2002/0108125 A1 | 8/2002 | Joao |
| 2002/0111934 A1 | 8/2002 | Narayan |
| 2002/0112002 A1 | 8/2002 | Abato |
| 2002/0124246 A1 | 9/2002 | Kaminsky et al. |
| 2002/0133705 A1 | 9/2002 | Tagashira et al. |
| 2002/0138852 A1 | 9/2002 | Reynolds et al. |
| 2002/0144262 A1 | 10/2002 | Plotnick et al. |
| 2002/0144273 A1 | 10/2002 | Reto |
| 2002/0150247 A1 | 10/2002 | Linnartz et al. |
| 2002/0157112 A1 | 10/2002 | Kuhn |
| 2002/0162118 A1 | 10/2002 | Levy et al. |
| 2002/0174425 A1 | 11/2002 | Markel et al. |
| 2002/0194592 A1 | 12/2002 | Tsuchida et al. |
| 2002/0197063 A1 | 12/2002 | Cho |
| 2003/0021441 A1 | 1/2003 | Levy et al. |
| 2003/0039465 A1 | 2/2003 | Bjorgan et al. |
| 2003/0055949 A1 | 3/2003 | Coulombe et al. |
| 2003/0079131 A1 | 4/2003 | Reefman |
| 2003/0088674 A1 | 5/2003 | Ullman et al. |
| 2003/0093810 A1 | 5/2003 | Taniguchi |
| 2003/0105870 A1 | 6/2003 | Baum |
| 2003/0108200 A1 | 6/2003 | Sako |
| 2003/0115598 A1 | 6/2003 | Pantoja |
| 2003/0149890 A1 * | 8/2003 | Shen et al. .................... 713/200 |
| 2003/0177488 A1 | 9/2003 | Smith et al. |
| 2003/0185232 A1 | 10/2003 | Moore et al. |
| 2004/0003394 A1 | 1/2004 | Ramaswamy |
| 2004/0009763 A1 | 1/2004 | Stone et al. |
| 2004/0019690 A1 | 1/2004 | Cardno et al. |
| 2004/0025181 A1 | 2/2004 | Addington et al. |
| 2004/0037271 A1 | 2/2004 | Liscano et al. |
| 2004/0038692 A1 | 2/2004 | Muzaffar |
| 2004/0064319 A1 | 4/2004 | Nehauser et al. |
| 2004/0073916 A1 | 4/2004 | Petrovic et al. |
| 2004/0073951 A1 | 4/2004 | Bae et al. |
| 2004/0088556 A1 | 5/2004 | Weirauch |
| 2004/0125125 A1 | 7/2004 | Levy |
| 2004/0128514 A1 | 7/2004 | Rhoads |
| 2004/0137929 A1 | 7/2004 | Jones et al. |
| 2004/0146161 A1 | 7/2004 | De Jong |
| 2004/0153649 A1 | 8/2004 | Rhoads et al. |
| 2004/0156489 A1 | 8/2004 | Vishik et al. |
| 2004/0199387 A1 | 10/2004 | Wang et al. |
| 2004/0254887 A1 | 12/2004 | Jacoby |
| 2005/0028189 A1 | 2/2005 | Heine et al. |
| 2005/0033758 A1 | 2/2005 | Baxter |
| 2005/0058319 A1 | 3/2005 | Rhoads et al. |
| 2005/0086682 A1 | 4/2005 | Burges et al. |
| 2005/0138179 A1 | 6/2005 | Encarnaction et al. |
| 2005/0144004 A1 | 6/2005 | Bennett et al. |
| 2005/0152287 A1 | 7/2005 | Yokomitsu et al. |
| 2005/0177738 A1 | 8/2005 | Van Der Veen et al. |
| 2005/0188297 A1 | 8/2005 | Knight et al. |
| 2005/0192933 A1 | 9/2005 | Rhoads et al. |
| 2005/0193425 A1 | 9/2005 | Sull et al. |
| 2005/0204379 A1 | 9/2005 | Yamamori |
| 2005/0216346 A1 | 9/2005 | Kusumoto et al. |
| 2005/0234774 A1 | 10/2005 | Dupree |
| 2006/0026431 A1 | 2/2006 | Campello De Souza |
| 2006/0031297 A1 | 2/2006 | Zuidema |
| 2006/0056625 A1 | 3/2006 | Nakabayashi et al. |
| 2006/0059277 A1 | 3/2006 | Zito et al. |
| 2006/0095401 A1 | 5/2006 | Krikorian et al. |
| 2006/0107195 A1 | 5/2006 | Ramaswamy et al. |
| 2006/0107302 A1 | 5/2006 | Zdepski |
| 2006/0136564 A1 | 6/2006 | Ambrose |
| 2006/0161635 A1 | 7/2006 | Lamkin et al. |
| 2006/0167747 A1 | 7/2006 | Goodman et al. |
| 2006/0168613 A1 | 7/2006 | Wood et al. |
| 2006/0195614 A1 | 8/2006 | Sena et al. |
| 2006/0195886 A1 * | 8/2006 | Ashley .................... 725/138 |
| 2006/0212705 A1 | 9/2006 | Thommana et al. |
| 2006/0221173 A1 | 10/2006 | Duncan |
| 2006/0224798 A1 | 10/2006 | Klein et al. |
| 2006/0242325 A1 | 10/2006 | Ramaswamy et al. |
| 2007/0006250 A1 | 1/2007 | Croy et al. |
| 2007/0016918 A1 | 1/2007 | Alcorn et al. |
| 2007/0055987 A1 | 3/2007 | Lu et al. |
| 2007/0074020 A1 * | 3/2007 | Nishimura .................... 713/168 |
| 2007/0083611 A1 | 4/2007 | Farago et al. |
| 2007/0110089 A1 | 5/2007 | Essafi et al. |
| 2007/0112837 A1 | 5/2007 | Houh et al. |
| 2007/0118375 A1 | 5/2007 | Kenyon et al. |
| 2007/0118873 A1 | 5/2007 | Houh et al. |
| 2007/0124771 A1 | 5/2007 | Shvadron |
| 2007/0127717 A1 | 6/2007 | Herre et al. |
| 2007/0129952 A1 | 6/2007 | Kenyon et al. |
| 2007/0133223 A1 | 6/2007 | Fredley et al. |
| 2007/0136753 A1 | 6/2007 | Bovenschulte et al. |
| 2007/0136777 A1 | 6/2007 | Hasek et al. |
| 2007/0149114 A1 | 6/2007 | Danilenko |
| 2007/0157262 A1 | 7/2007 | Ramaswamy et al. |
| 2007/0162927 A1 | 7/2007 | Ramaswamy et al. |
| 2007/0186228 A1 | 8/2007 | Ramaswamy et al. |
| 2007/0198738 A1 | 8/2007 | Angiolillo et al. |
| 2007/0201835 A1 | 8/2007 | Rhoads |
| 2007/0226760 A1 | 9/2007 | Neuhauser et al. |
| 2007/0250901 A1 | 10/2007 | McIntire et al. |
| 2007/0274523 A1 | 11/2007 | Rhoads |
| 2007/0276925 A1 | 11/2007 | La Joie et al. |
| 2007/0276926 A1 | 11/2007 | La Joie et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0027734 A1 | 1/2008 | Zhao et al. |
| 2008/0028223 A1 | 1/2008 | Rhoads |
| 2008/0040354 A1 | 2/2008 | Ray et al. |
| 2008/0046499 A1 | 2/2008 | Cabrera et al. |
| 2008/0059160 A1 | 3/2008 | Saunders et al. |
| 2008/0065507 A1 | 3/2008 | Morrison et al. |
| 2008/0077956 A1 | 3/2008 | Morrison et al. |
| 2008/0082510 A1 | 4/2008 | Wang et al. |
| 2008/0082922 A1 | 4/2008 | Biniak et al. |
| 2008/0083003 A1 | 4/2008 | Biniak et al. |
| 2008/0104624 A1 | 5/2008 | Narasimhan et al. |
| 2008/0120661 A1 | 5/2008 | Ludvig et al. |
| 2008/0133223 A1 * | 6/2008 | Son et al. .................... 704/200.1 |
| 2008/0139182 A1 | 6/2008 | Levy et al. |
| 2008/0140573 A1 | 6/2008 | Levy et al. |
| 2008/0168503 A1 | 7/2008 | Sparrell |
| 2008/0184132 A1 | 7/2008 | Zato |
| 2008/0200999 A1 | 8/2008 | Hakansson |
| 2008/0209491 A1 | 8/2008 | Hasek |
| 2008/0219496 A1 | 9/2008 | Tewfik et al. |
| 2008/0219637 A1 | 9/2008 | Sandrew |
| 2008/0235077 A1 | 9/2008 | Harkness et al. |
| 2008/0240490 A1 | 10/2008 | Finkelstein et al. |
| 2008/0249961 A1 | 10/2008 | Harkness et al. |
| 2008/0310629 A1 * | 12/2008 | Van Der Veen et al. ...... 380/201 |
| 2009/0007169 A1 | 1/2009 | Headley et al. |
| 2009/0015599 A1 | 1/2009 | Bennett et al. |
| 2009/0070408 A1 | 3/2009 | White |
| 2009/0083417 A1 | 3/2009 | Hughes et al. |
| 2009/0086812 A1 | 4/2009 | Ducharme |
| 2009/0103887 A1 | 4/2009 | Choi et al. |
| 2009/0119723 A1 | 5/2009 | Tinsman |
| 2009/0129588 A1 | 5/2009 | Takakusu et al. |
| 2009/0133093 A1 | 5/2009 | Hodge |
| 2009/0150553 A1 | 6/2009 | Collart et al. |
| 2009/0158318 A1 | 6/2009 | Levy |
| 2009/0164564 A1 | 6/2009 | Willis |
| 2009/0228492 A1 | 9/2009 | Valdez et al. |
| 2009/0248886 A1 | 10/2009 | Tan et al. |
| 2009/0259325 A1 | 10/2009 | Topchy et al. |
| 2009/0265214 A1 | 10/2009 | Jobs et al. |
| 2009/0276313 A1 | 11/2009 | Wilhelm |
| 2009/0307061 A1 | 12/2009 | Monighetti et al. |
| 2009/0307084 A1 | 12/2009 | Monighetti et al. |
| 2010/0008586 A1 | 1/2010 | Meyer et al. |

(56) References Cited

U.S. PATENT DOCUMENTS

| | | | |
|---|---|---|---|
| 2010/0009722 A1 | 1/2010 | Levy et al. | |
| 2010/0023405 A1 | 1/2010 | Liu | |
| 2010/0088583 A1 | 4/2010 | Schachter | |
| 2010/0094897 A1 | 4/2010 | Sumrall et al. | |
| 2010/0135638 A1 | 6/2010 | Mio | |
| 2010/0174774 A1 | 7/2010 | Kern et al. | |
| 2010/0226526 A1 | 9/2010 | Modro et al. | |
| 2010/0241963 A1 | 9/2010 | Kulis et al. | |
| 2010/0262711 A1 | 10/2010 | Bouazizi | |
| 2010/0280641 A1 | 11/2010 | Harkness et al. | |
| 2010/0306257 A1* | 12/2010 | Levy | 707/770 |
| 2010/0318600 A1 | 12/2010 | Furbeck | |
| 2011/0016231 A1 | 1/2011 | Ramaswamy et al. | |
| 2011/0030031 A1 | 2/2011 | Lussier et al. | |
| 2011/0055314 A1 | 3/2011 | Rosenstein et al. | |
| 2011/0078721 A1 | 3/2011 | Wang et al. | |
| 2011/0145246 A1 | 6/2011 | Prager et al. | |
| 2011/0145581 A1 | 6/2011 | Malhotra et al. | |
| 2011/0154185 A1 | 6/2011 | Kern et al. | |
| 2011/0173200 A1 | 7/2011 | Yang et al. | |
| 2011/0196921 A1 | 8/2011 | Sylthe | |
| 2011/0252118 A1 | 10/2011 | Pantos et al. | |
| 2011/0321003 A1 | 12/2011 | Doig et al. | |
| 2012/0023516 A1 | 1/2012 | Wolinsky et al. | |
| 2012/0096546 A1 | 4/2012 | Dilley et al. | |
| 2012/0124605 A1 | 5/2012 | Praden | |
| 2012/0137015 A1 | 5/2012 | Sun | |
| 2012/0265735 A1 | 10/2012 | McMillan | |
| 2012/0311126 A1 | 12/2012 | Jadallah et al. | |
| 2013/0007298 A1 | 1/2013 | Ramaswamy et al. | |
| 2013/0007794 A1 | 1/2013 | Besehanic et al. | |
| 2013/0061275 A1 | 3/2013 | Seo et al. | |
| 2013/0097285 A1 | 4/2013 | van Zwol et al. | |
| 2013/0124747 A1 | 5/2013 | Harrang et al. | |
| 2013/0202150 A1 | 8/2013 | Sinha et al. | |
| 2013/0231931 A1 | 9/2013 | Kulis et al. | |
| 2013/0247078 A1 | 9/2013 | Nikankin et al. | |
| 2013/0268623 A1 | 10/2013 | Besehanic et al. | |
| 2013/0268630 A1 | 10/2013 | Besehanic et al. | |
| 2013/0290508 A1 | 10/2013 | Besehanic et al. | |
| 2013/0291001 A1 | 10/2013 | Besehanic et al. | |
| 2013/0297410 A1 | 11/2013 | Oh et al. | |
| 2013/0311776 A1 | 11/2013 | Besehanic | |
| 2013/0311780 A1 | 11/2013 | Besehanic | |
| 2014/0082220 A1 | 3/2014 | Ramaswamy et al. | |
| 2014/0229629 A1 | 8/2014 | Besehanic | |
| 2014/0229970 A1 | 8/2014 | Besehanic | |
| 2014/0244828 A1 | 8/2014 | Besehanic | |
| 2014/0298365 A1 | 10/2014 | Matsubara et al. | |
| 2014/0301386 A1 | 10/2014 | Harrenstein et al. | |

FOREIGN PATENT DOCUMENTS

| | | |
|---|---|---|
| AU | 2003230993 | 11/2003 |
| AU | 2006203639 | 9/2006 |
| BR | 0112901 | 6/2003 |
| BR | 0309598 | 2/2005 |
| CA | 2483104 | 11/2003 |
| CN | 1592906 | 3/2005 |
| CN | 1647160 | 7/2005 |
| CN | 101115124 | 1/2008 |
| EP | 0769749 | 4/1997 |
| EP | 1176826 | 1/2002 |
| EP | 1349370 | 10/2003 |
| EP | 1406403 | 4/2004 |
| EP | 1307833 | 6/2006 |
| EP | 1745464 | 10/2007 |
| EP | 1853026 | 11/2007 |
| EP | 1704695 | 2/2008 |
| EP | 1504445 | 8/2008 |
| JP | 2002247610 | 8/2002 |
| JP | 2003524199 | 8/2003 |
| JP | 2004320752 | 11/2004 |
| WO | 95/27349 | 10/1995 |
| WO | 97/02672 | 1/1997 |
| WO | 00/04662 | 1/2000 |
| WO | 00/19699 | 4/2000 |
| WO | 01/19088 | 3/2001 |
| WO | 01/24027 | 4/2001 |
| WO | 01/31497 | 5/2001 |
| WO | 01/40963 | 6/2001 |
| WO | 01/46782 | 6/2001 |
| WO | 0146782 | 6/2001 |
| WO | 01/53922 | 7/2001 |
| WO | 01/75743 | 10/2001 |
| WO | 01/91109 | 11/2001 |
| WO | 02/05517 | 1/2002 |
| WO | 03/009277 | 1/2002 |
| WO | 02/11123 | 2/2002 |
| WO | 02/15081 | 2/2002 |
| WO | 02/17591 | 2/2002 |
| WO | 02/19625 | 3/2002 |
| WO | 02/27600 | 4/2002 |
| WO | 02/37381 | 5/2002 |
| WO | 02/45034 | 6/2002 |
| WO | 02/061652 | 8/2002 |
| WO | 02/065305 | 8/2002 |
| WO | 02/065318 | 8/2002 |
| WO | 02/069121 | 9/2002 |
| WO | 03/091990 | 11/2003 |
| WO | 03/094499 | 11/2003 |
| WO | 03/096337 | 11/2003 |
| WO | 2004/010352 | 1/2004 |
| WO | 2004/040416 | 5/2004 |
| WO | 2004/040475 | 5/2004 |
| WO | 2004/061699 | 7/2004 |
| WO | 2005/025217 | 3/2005 |
| WO | 2005/064885 | 7/2005 |
| WO | 2005/101243 | 10/2005 |
| WO | 2005/111998 | 11/2005 |
| WO | 2006/012241 | 2/2006 |
| WO | 2006/025797 | 3/2006 |
| WO | 2007/056531 | 5/2007 |
| WO | 2007/056532 | 5/2007 |
| WO | 2008/042953 | 4/2008 |
| WO | 2008/044664 | 4/2008 |
| WO | 2008/045950 | 4/2008 |
| WO | 2008/110002 | 9/2008 |
| WO | 2008/110790 | 9/2008 |
| WO | 2009/011206 | 1/2009 |
| WO | 2009/061651 | 5/2009 |
| WO | 2009/064561 | 5/2009 |
| WO | 2010095320 | 8/2010 |
| WO | 2010/127268 | 11/2010 |
| WO | 2012177866 | 12/2012 |
| WO | 2012177870 | 12/2012 |
| WO | 2012177872 | 12/2012 |
| WO | 2012177874 | 12/2012 |

OTHER PUBLICATIONS

CIPO, "Office Action," issued in connection with Canadian Application Serial No. 2,574,998, mailed Mar. 23, 2009 (5 pages).

CIPO, "Office Action," issued in connection with Canadian Application Serial No. 2,574,998, mailed Nov. 13, 2009 (10 pages).

Patent Cooperation Treaty, "International Search Report," issued in connection with International Application Serial No. PCT/US2003/14970, mailed Feb. 10, 2004 (1 page).

Patent Cooperation Treaty, "International Preliminary Examination Report," issued in connection with International Application Serial No. PCT/US2003/014970, completed Aug. 21, 2004 (6 pages).

Patent Cooperation Treaty, "International Search Report," issued in connection with International Application Serial No. PCT/US2003/031180, mailed Jun. 8, 2004 (5 pages).

Patent Cooperation Treaty, "International Preliminary Examination Report," issued in connection with International Application Serial No. PCT/US2003/031180, mailed Aug. 17, 2004 (4 pages).

Patent Cooperation Treaty, "International Search Report and Written Opinion," issued in connection with International Application Serial No. PCT/US2005/026426, mailed Aug. 18, 2006 (10 pages).

Patent Cooperation Treaty, "International Preliminary Report on Patentability," issued in connection with International Application Serial No. PCT/US2005/026426, mailed Feb. 1, 2007 (9 pages).

(56) References Cited

OTHER PUBLICATIONS

Patent Cooperation Treaty, "International Search Report and Written Opinion," issued in connection with International Application Serial No. PCT/US2009/061827, mailed Mar. 15, 2010 (12 pages).
Patent Cooperation Treaty, "International Search Report and Written Opinion," issued in connection with International Application Serial No. PCT/US2009/061750, mailed Mar. 3, 2010 (10 pages).
Patent Cooperation Treaty, International Search Report and Written Opinion, issued in connection with International Application Serial No. PCT/US2010/033201, mailed Oct. 1, 2010 (16 pages).
Patent Cooperation Treaty, "International Search Report and Written Opinion," issued in connection with International Application Serial No. PCT/US2009/061479, mailed May 26, 2010 (15 pages).
Patent Cooperation Treaty, "International Search Report and Written Opinion ", issued in connection with International application No. PCT/US2012/043546, mailed Dec. 10, 2012, (6 pages).
Patent Cooperation Treaty, "International Search Report and Written Opinion", issued in connection with International application No. PCT/US2012/043539, mailed Jan. 17, 2013, (9 pages).
Patent Cooperation Treaty, "International Search Report and Written Opinion", issued in connection with International application No. PCT/US2012/043544, mailed Jan. 17, 2013, (15 pages).
Shazam, "Shazam and VidZone Digital Media announce UK1s first fixed price mobile download service for music videos," http://www.shazam.com/music/web/newsdetail.html?nid=NEWS136, Feb. 11, 2008 (1 page).
Shazam, "Shazam launches new music application for Facebook fans," http://www.shazam.com/music/web/newsdetail.html?nid=NEWS135, Feb. 18, 2008 (1 page).
Shazam, "Shazam turns up the volume on mobile music," http://www.shazam.com/music/web/newsdetail.html?nid=NEWS137, Nov. 28, 2007 (1 page).
Shazam, Company summary outline and list of products, undated (1 page).
Stross, "Apple Wouldn't Risk Its Cool Over a Gimmick, Would It?," The New York Times, Nov. 14, 2009 (3 pages).
Stultz, "Handheld Captioning at Disney World Theme Parks," article retrieved on Mar. 8, 2013, http://goflorida.about.com/od/disneyworld/a/wdw_captioning.htm, (1 page).
Sullivan, "Google Cozies Up to SMBs for Digital Content," MediaPost News, Mar. 19, 2009 (3 pages).
U.S. Appl. No. 61/499,520, filed Jun. 21, 2011, (51 pages).
U.S. Appl. No. 61/568,631, filed Dec. 8, 2011, (80 pages).
USPTO, "Advisory Action," issued in connection with U.S. Appl. No. 10/540,611, mailed Jan. 22, 2010 (4 pages).
USPTO, "Final Office Action," issued in connection with U.S. Appl. No. 10/540,611, mailed Sep. 29, 2009 (36 pages).
USPTO, "Non-Final Office Action," issued in connection with U.S. Appl. No. 10/540,611, mailed Mar. 4, 2009 (33 pages).
USPTO, "Non-Final Office Action," issued in connection with U.S. Appl. No. 10/540,611, mailed Sep. 15, 2008 (22 pages).
USPTO, "Non-Final Office Action," issued in connection with U.S. Appl. No. 12/890,216, mailed Apr. 2, 2012 (33 pages).
USPTO, "Notice of Allowance," issued in connection with U.S. Appl. No. 10/540,611, mailed Jun. 22, 2010 (26 pages).
USPTO, "Advisory Action," issued in connection with U.S. Appl. No. 11/618,245, mailed Sep. 30, 2009 (4 pages).
USPTO, "Final Office Action," issued in connection with U.S. Appl. No. 10/530,233, mailed Mar. 18, 2010 (23 pages).
USPTO, "Final Office Action," issued in connection with U.S. Appl. No. 11/618,245, mailed Jul. 21, 2009 (31 pages).
USPTO, "Non-Final Office Action," issued in connection with U.S. Appl. No. 10/530,233, mailed Sep. 16, 2009 (31 pages).
USPTO, "Non-Final Office Action," issued in connection with U.S. Appl. No. 11/618,245, mailed Feb. 5, 2009 (48 pages).
Van Beek et al., "Metadata-Driven Multimedia Access," IEEE Signal Processing Magazine, vol. 20, No. 2, Institute of Electric and Electronic Engineers, Inc., New York, New York, USA, Mar. 2003 (13 pages).
Vetro et al., "Video Transcoding Architectures and Techniques: An Overview," IEEE Signal Processing Magazine, vol. 20, No. 2, Institute of Electric and Electronic Engineers, Inc., New York, New York, USA, Mar. 2003 (12 pages).
Wactlar et al., "Digital Video Archives: Managing Through Metadata" Building a National Strategy for Digital Preservation: Issues in Digital Media Archiving, http://www.informedia.cs.cmu.edu/documents/Wactlar-CLIR-final.pdf, Apr. 2002 (14 pages).
Wang, "An Industrial-Strength Audio Search Algorithm," Shazam Entertainment, Ltd., in Proceedings of the Fourth International Conference on Music Information Retrieval, Baltimore, Oct. 26-30, 2003 (7 pages).
USPTO, "Non-Final Office Action," issued in connection with U.S. Appl. No. 12/890,216, mailed Nov. 29, 2012 (22 pages).
USPTO, "Requirement for Restriction," issued in connection with U.S. Appl. No. 10/530,233, mailed Jun. 10, 2009 (20 pages).
USPTO, "Non-Final Office Action," issued in connection with U.S. Appl. No. 11/618,245, mailed Apr. 28, 2011 (48 pages).
USPTO, "Final Office Action," issued in connection with U.S. Appl. No. 11/618,245, mailed Oct. 26, 2011 (38 pages).
"Video: timed text tracks", Windows Internet Explorer, Microsoft, 2012, http://msdn.microsoft.com/en-us/library/ie/hh673566(v=vs.85).aspx, (6 pages).
R. Pantos, Ed., & W. May, Apple Inc. "HTTP Live Streaming: draft-pantos-http-live-streaming-07", Sep. 2011, (33 pages).
Apple Inc. "Timed Metadata for HTTP Live Streaming", Apr. 28, 2011, (12 pages).
Apple Inc. "HTTP Live Streaming Overview", Apr. 1, 2011, (36 pages).
Eric Winkelman, "Timed Text Tracks and TV Services", Aug. 15, 2011, (5 pages).
USPTO, "Non-Final Office Action," issued in connection with U.S. Appl. No. 13/341,661, mailed Mar. 19, 2013 (10 pages).
USPTO, "Restriction," issued in connection with U.S. Appl. No. 13/181,147, mailed Aug. 10, 2012 (4 pages).
USPTO, "Non-Final Office Action," issued in connection with U.S. Appl. No. 13/181,147, mailed Nov. 21, 2012 (30 pages).
U.S. Appl. No. 13/778,108, filed Feb. 26, 2013, (66 pages).
U.S. Appl. No. 13/767,548, filed Feb. 14, 2013, (68 pages).
PCT Application No. PCT/US12/43535, filed Jun. 21, 2012, (83 pages).
PCT Application No. PCT/US12/43539, filed Jun. 21, 2012, (50 pages).
PCT Application No. PCT/US12/43544, filed Jun. 21, 2012, (72 pages).
PCT Application No. PCT/US12/43546, filed Jun. 21, 2012, (61 pages).
U.S. Appl. No. 13/443,596, filed Apr. 10, 2012, (50 pages).
"What is Jacked?," http://www.jacked.com/, retrieved on Dec. 3, 2009 (1 page).
Anderson, "Google to compete with Nielsen for TV-ratings info?," Ars Technica, Jun. 19, 2006 (3 pages).
Boehret, "Yahoo Widgets Lend Brains to Boob Tube," The Wall Street Journal, Mar. 25, 2009 (4 pages).
Claburn, "Google Researchers Propose TV Monitoring," Information Week, Jun. 7, 2006 (4 pages).
Evain, "TV-Anytime Metadata—A Preliminary Specification on Schedule!," EBU Technical Review, Sep. 2000 (15 pages).
Fink et al., "Social- and Interactive-Television Applications Based on Real-Time Ambient-Audio Identification," EuroITV, 2006 (10 pages).
Heuer et al., "Adaptive Multimedia Messaging based on MPEG-7—The M3-Box,", Proc. Second Int'l Symposium on Mobile Multimedia Systems Applications, Nov. 9-10, 2000 (8 pages).
Heussner, "Sound-Triggered Smart Phone Ads Seek You Out,"Adweek.com, http://www.adweek.com/news/advertising-branding/sound-triggered-smartphone-ads-seek-you-out-136901, Dec. 7, 2011 (3 pages).
Hopper, "EBU Project Group P/META Metadata Exchange Standards," EBU Technical Review, Sep. 2000 [http://www.ebu.ch/en/technical/trev/trev_284-contents.html, retrieved on Jul. 20, 2006] (25 pages).

(56) References Cited

OTHER PUBLICATIONS

Kane, "Entrepreneur Plans On-Demand Videogame Service," The Wall Street Journal, Mar. 24, 2009 (2 pages).
Laven,"EBU Technical Review (Editorial)," No. 284, Sep. 2000 [http://www.ebu.ch/en/technical/trev/trev_284-contents.html, retrieved on Jul. 20, 2006] (3 pages).
Mulder, "The Integration of Metadata From Production to Consumer," EBU Technical Review, Sep. 2000 [http://www.ebu.ch/en/technical/trev/trev_284-contents.html, retrieved on Jul. 20, 2006] (6 pages).
U.S. Appl. No. 13/455,961, filed Apr. 25, 2012, (61 pages).
U.S. Appl. No. 13/793,983, filed Mar. 11, 2013, (68 pages).
U.S. Appl. No. 13/793,991, filed Mar. 11, 2013, (47 pages).
U.S. Appl. No. 13/793,974, filed Mar. 11, 2013, (58 pages).
U.S. Appl. No. 13/793,959, filed Mar. 11, 2013, (68 pages).
United States Patent and Trademark Office, "Notice of Allowance," issued in connection with U.S. Appl. No. 12/890,216 on Aug. 6, 2013, 14 pages.
United States Patent and Trademark Office, "Office Action," issued in connection with U.S. Appl. No. 13/181,147 on Aug. 15, 2013, 46 pages.
United States Patent and Trademark Office, "Office Action," issued in connection with U.S. Appl. No. 13/793,983 on Nov. 8, 2013, 13 pages.
United States Patent and Trademark Office, "Office Action," issued in connection with U.S. Appl. No. 13/443,596 on Nov. 21, 2013, 25 pages.
United States Patent and Trademark Office, "Office Action," issued in connection with U.S. Appl. No. 13/793,991 on Dec. 6, 2013, 21 pages.
Patent Cooperation Treaty, "International Search Report and Written Opinion," issued in connection with International application No. PCT/ US2012/043535, dated Feb. 21, 2013, 15 pages.
United States Patent and Trademark Office, "Notice of Allowance," issued in connection with U.S. Appl. No. 13/341,661 on Sep. 23, 2013, 9 pages.
International Searching Authority, "International Preliminary Report on Patentability", issued in connection with corresponding International Application No. PCT/US2012/043544, dated Dec. 23, 2013 (8 pages).
Canadian Intellectual Property Office, "Office Action," issued in connection with application No. CA 2,773,567, on Mar. 6, 2014, 2 pages.
State Intellectual Property Office of China, "First Office Action," issued in connection with application No. CN 201210105474.3, on Feb. 8, 2014, 15 pages.
United States Patent and Trademark Office, "Final Office Action", issued in connection with U.S. Appl. No. 13/181,147, dated Mar. 10, 2014 (48 pages).
United States Patent and Trademark Office, "Final Office Action", issued in connection with U.S. Appl. No. 13/443,596, dated Apr. 9, 2014 (20 pages).
United States Patent and Trademark Office, "Final Office Action", issued in connection with U.S. Appl. No. 13/793,991, dated Apr. 11, 2014 (15 pages).
United States Patent and Trademark Office, "Non-Final Office Action", issued in connection with U.S. Appl. No. 13/341,646, dated Jun. 5, 2014 (17 pages).
United States Patent and Trademark Office, "Final Office Action", issued in connection with U.S. Appl. No. 13/793,983, dated Jun. 6, 2014 (13 pages).
IP Australia, "Examination Report", issued in connection with Australian Patent Application No. 2012272868, dated Jun. 27, 2014 (3 pages).
IP Australia, "Examination Report", issued in connection with Australian Patent Application No. 2012272874, dated Jun. 27, 2014 (3 pages).
IP Australia, "Examination Report", issued in connection with Australian Patent Application No. 2012272872, dated Jun. 24, 2014 (4 pages).
United States Patent and Trademark Office, "Notice of Allowance", issued in connection with U.S. Appl. No. 13/341,646, dated Nov. 3, 2014 (10 pages).
United States Patent and Trademark Office, "Notice of Allowance", issued in connection with U.S. Appl. No. 13/341,661 dated Jul. 8, 2014 (8 pages).
IP Australia, "Examination Report", issued in connection with Australian Patent Application No. 2013204488, dated Aug. 12, 2014 (5 pages).
IP Australia, "Examination Report", issued in connection with Australian Patent Application No. 2013203778, dated Aug. 21, 2014 (5 pages).
IP Australia, "Examination Report", issued in connection with Australian Patent Application No. 2012272876, dated Sep. 18, 2014 (4 pages).
United States Patent and Trademark Office, "Non-Final Office Action", issued in connection with U.S. Appl. No. 13/443,596, dated Sep. 25, 2014 (22 pages).
United States Patent and Trademark Office, "Non-Final Office Action", issued in connection with U.S. Appl. No. 13/455,961, dated Dec. 5, 2014 (13 pages).
United States Patent and Trademark Office, "Non-Final Office Action", issued in connection with U.S. Appl. No. 13/793,991, dated Nov. 10, 2014 (19 pages).
United States Patent and Trademark Office, "Final Office Action", issued in connection with U.S. Appl. No. 13/443,596, dated Feb. 26, 2015 (25 pages).
United States Patent and Trademark Office, "Final Office Action", issued in connection with U.S. Appl. No. 13/793,991, dated Feb. 27, 2015 (21 pages).
United States Patent and Trademark Office, "Non-Final Office Action", issued in connection with U.S. Appl. No. 13/778,108, dated Feb. 27, 2015 (13 pages).
United States Patent and Trademark Office, "Non-Final Office Action", issued in connection with U.S. Appl. No. 13/341,646, dated Mar. 3, 2015 (7 pages).
United States Patent and Trademark Office, "Notice of Allowance", issued in connection with U.S. Appl. No. 13/793,983, dated Jan. 9, 2015 (12 pages).
United States Patent and Trademark Office, "Non-Final Office Action", issued in connection with U.S. Appl. No. 13/793,959 dated Jan. 30, 2015 (11 pages).
United States Patent and Trademark Office, "Non-Final Office Action", issued in connection with U.S. Appl. No. 13/767,548, dated Feb. 3, 2015 (10 pages).
United States Patent and Trademark Office, "Examiner's Answer to Appeal Brief", issued in connection with U.S. Appl. No. 13/181,147, dated Dec. 22, 2014 (34 pages).
United States Patent and Trademark Office, "Non-Final Office Action", issued in connection with U.S. Appl. No. 13/793,974, dated Feb. 18, 2015 (12 pages).
Mexican Patent Office, "Office Action", issued in connection with Mexican Patent Application No. MX/a/2014/000280, dated Jan. 21, 2015 (5 pages, English translation included).
Japanese Patent Office, "Notice of Reasons for Rejection", issued in connection with Japanese Patent Application No. P2014-517158, dated Mar. 3, 2015 (7 pages).
Mexican Patent Office, "Notice of Allowance", issued in connection with Mexican Patent Application No. MX/a/2014/000281, dated Feb. 25, 2015 (1 pages).
United States Patent and Trademark Office, "Notice of Allowance", issued in connection with U.S. Appl. No. 13/793,983, dated Mar. 16, 2015 (9 pages).
United States Patent and Trademark Office, "Final Office Action", issued in connection with U.S. Appl. No. 13/341,661, dated Mar. 26, 2015 (13 pages).
European Patent Office, "European Search Report", issued in connection with European Patent Application No. 12803215.8, dated Apr. 20, 2015 (9 pages).
Canadian Patent Office, "Office Action", issued in connection with Canadian Patent Application No. 2,840,092, dated Apr. 24, 2015 (4 pages).

(56) References Cited

OTHER PUBLICATIONS

United States Patent and Trademark Office, "Final Office Action", issued in connection with U.S. Appl. No. 13/455,961, dated May 20, 2015 (14 pages).
State Intellectual Property Office, "Notice of Allowance" issued in connection with Application No. 201210105474.3, May 25, 2015 (5 pages).
United States Patent and Trademark Office, "Final Office Action", issued in connection with U.S. Appl. No. 13/793,974, dated May 28, 2015 (13 pages).
Canadian Intellectual Property Office, "Office Action", issued in connection with Canadian Patent Application No. 2,840,094, dated May 19, 2015 (4 pages).
United States Patent and Trademark Office, "Non-Final Office Action", issued in connection with U.S. Appl. No. 14/089,279, dated Mar. 28, 2014 (13 pages).
United States Patent and Trademark Office, "Final Office Action", issued in connection with U.S. Appl. No. 14/089,279, dated Nov. 21, 2014 (22 pages).
United States Patent and Trademark Office, "Non-Final Office Action", issued in connection with U.S. Appl. No. 14/089,279, dated Apr. 23, 2015 (23 pages).
European Patent Office, "European Search Report", issued in connection with European Patent Application No. 12802805.7, dated May 27, 2015 (8 pages).
European Patent Office, "European Search Report", issued in connection with European Patent Application No. 12802746.3, dated May 27, 2015 (9 pages).
United States Patent and Trademark Office, "Notice of Allowance," Issued in connection with U.S. Appl. No. 13/341,646, Dated Jun. 19, 2015, (9 pages).
Mexican Patent Office, "Notice of Allowance", issued in connection with Mexican Patent Application No. MX/a/2014/000280, dated Jun. 12, 2015 (1 page).
European Patent Office, "European Search Report" issued in connection with European Patent Application No. 12802202.7 dated May 28, 2015 (7 pages).
United States Patent and Trademark Office, "Notice of Allowance", issued in connection with U.S. Appl. No. 13/793,983, dated Jul. 7, 2015 (10 pages).
IP Australia, "Notice of Acceptance", issued in connection with Australian Patent Application No. 2012272868, dated Jul. 22, 2015 (2 pages).
United States Patent and Trademark Office, "Final Office Action", issued in connection with U.S. Appl. No. 13/793,959, dated Sep. 11, 2015 (12 pages).
IP Australia, "Notice of Acceptance", issued in connection with Australian Patent Application No. 2012272872 dated Aug. 6, 2015 (2 pages).
United States Patent and Trademark Office, "Final Office Action", issued in connection with U.S. Appl. No. 13/767,548 dated Aug. 11, 2015 (12 pages).
United States Patent and Trademark Office, "Final Office Action", issued in connection with U.S. Appl. No. 13/778,108 dated Aug. 13, 2015 (16 pages).
United States Patent and Trademark Office, "Non-Final Office Action", issued in connection with U.S. Appl. No. 13/455,961, dated Sep. 24, 2015 (16 pages).
United States Patent and Trademark Office, "Non-Final Office Action", issued in connection with U.S. Appl. No. 13/793,974, dated Sep. 24, 2015 (14 pages).
United States Patent and Trademark Office, "Non-Final Office Action", issued in connection with U.S. Appl. No. 13/443,596, dated Oct. 20, 2015 (23 pages).
United States Patent and Trademark Office, "Non-Final Office Action", issued in connection with U.S. Appl. No. 13/793,991, dated Oct. 22, 2015 (20 pages).
IP Australia, "Notice of Acceptance", issued in connection with Australian Patent Application No. 2012272874, dated Sep. 11, 2015 (2 pages).

* cited by examiner

METHODS AND APPARATUS TO MEASURE EXPOSURE TO STREAMING MEDIA

FIELD OF THE DISCLOSURE

This disclosure relates generally to measuring media exposure, and, more particularly, to methods and apparatus to measure exposure to streaming media.

BACKGROUND

Streaming enables media to be delivered to and presented by a wide variety of media presentation devices, such as desktop computers, laptop computers, tablet computers, personal digital assistants, smartphones, etc. A significant portion of media (e.g., content and/or advertisements) is presented via streaming to such devices.

DETAILED DESCRIPTION

Figure 1:
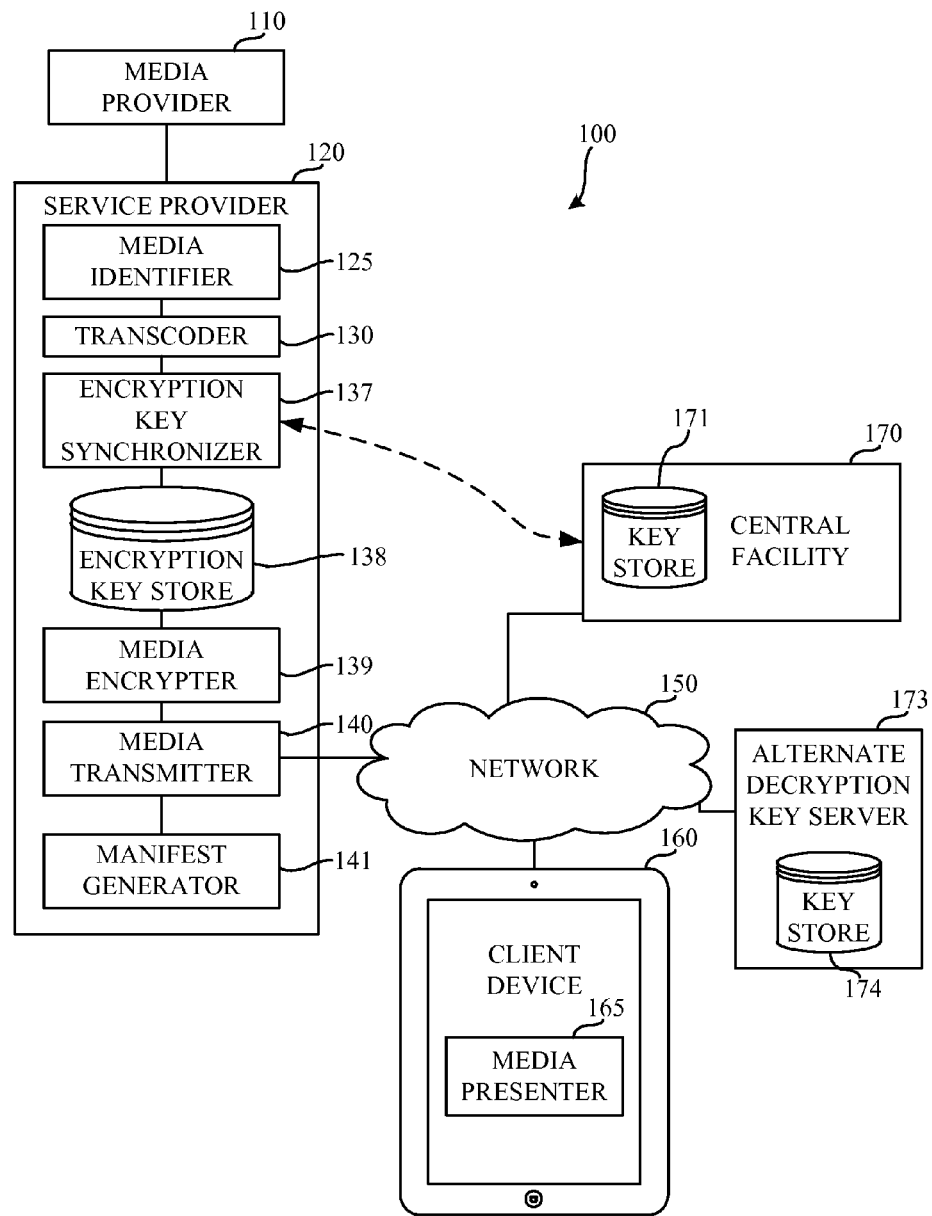
FIG. 1 is a diagram of an example system for measuring exposure to streaming media.

Example methods, apparatus, systems, and articles of manufacture disclosed herein may be used to measure exposure to streaming media. Some such example methods, apparatus, and/or articles of manufacture measure such exposure based on media metadata, user demographics, and/or media device types. Some examples disclosed herein may be used to monitor streaming media transmissions received at client devices such as personal computers, tablets (e.g., an iPad®), portable devices, mobile phones, Internet appliances, and/or any other device capable of playing media. Some example implementations disclosed herein may additionally or alternatively be used to monitor playback of media which is locally stored in media devices. Example monitoring processes disclosed herein collect media metadata associated with media presented via media devices and associate the metadata with demographics information of users of the media devices. In this manner, detailed exposure metrics are generated based on collected media metadata and associated user demographics.

The use of mobile devices (e.g., smartphones, tablets, MP3 players, etc.) to view media has increased in recent years. Initially, service providers created custom applications (e.g., apps) to display their media. As more types of mobile devices having different software requirements, versions, compatibilities, etc., entered the market, service providers began displaying streaming media in a browser of the mobile device. Consequently, many users view streaming media via the browser of their mobile device. In view of the increasing popularity of accessing media in this manner, understanding how users interact with the streaming media (e.g., such as by understanding what media is presented, how the media is presented, etc.) provides valuable information to service providers, advertisers, content providers, manufacturers, and/or other entities.

In examples illustrated herein, media is received from a media provider such as, for example, a satellite provider, a cable provider, a physical media provider (e.g., a Digital Versatile Disk (DVD)-by-mail service, etc.). The media is provided to be streamed from a service provider to one or more client devices for presentation thereon. In the illustrated example, the media is provided as a transport stream. In some examples, metering data having a first format is extracted from the transport stream. In some such examples, the transport stream corresponds to a Moving Picture Experts Group (MPEG) 2 transport stream sent according to a hypertext transfer protocol (HTTP) live streaming (HLS) protocol. However, the transport stream may additionally or alternatively correspond to and/or be sent according to any other past, present, or future format such as, for example, MPEG 4, an HTTP Secure protocol (HTTPS), a file transfer protocol (FTP), a secure file transfer protocol (SFTP).

Audio watermarking is a technique used to identify media such as television broadcasts, radio broadcasts, downloaded media, streaming media, prepackaged media, Digital Versatile Discs (DVDs), etc. Existing audio watermarking techniques identify media by embedding audio codes (e.g., a watermark), such as identifying information, into an audio and/or video component. As used herein, the terms "code" or "watermark" are used interchangeably and are defined to mean an identifier that may be transported with, inserted in, and/or embedded in the of media (e.g., a program or advertisement) or a signal transporting the media, for the purpose of identifying the media or for another purpose such as tuning (e.g., a packet identifying header).

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature, and can take the form of a series of digital values, a waveform, etc., representative of one or more aspects of the media signal(s), such as the audio and/or video signals, forming the media being monitored. A good signature is usually one that is repeatable when processing the same media presentation, but that is unique when processing other presentations of other media. Accordingly, the term "fingerprint" and "signature" are used interchangeably and are defined to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are known for the reference signature, these attributes may then be associated with the monitored media whose monitored signature matched the reference signature.

In some examples, metadata embedded in the media is in a first format (e.g., a watermark, a signature, a code, etc.). In some examples, the metering data having the first format includes an audio watermark that is embedded in an audio portion of the media. Additionally or alternatively, the metering data having the first format can include a video (e.g., image) watermark that is embedded in a video portion of the media. Many client devices do not have access to the metadata in the first format, and/or in some cases, enough processing power to identify the metadata in the first format.

In some examples, the streamed media is encrypted. In these examples illustrated herein, the service provider encrypts the media and instructs the client device to retrieve a decryption key for decrypting the encrypted media. Encrypting the media facilitates monitoring of media presentations, as client devices must request a decryption key prior to decrypting and subsequently presenting the media. In the illustrated example, the encryption key is paired with a decryption key. In some examples, the keys are a-symmetric in that, for example, the encryption key cannot be used to decrypt media that has been encrypted using the encryption key. However, in some other examples, the keys are symmetric.

In some disclosed examples, the encryption and/or decryption keys are based on metadata extracted from media decoded from the transport stream. However in some examples, the encryption and/or decryption keys are randomly generated.

In some disclosed examples, the encryption and/or decryption keys are generated by a central facility of an audience measurement entity. In some examples, the central facility receives metadata extracted from media decoded from the transport stream by a service provider. The central facility generates the encryption and/or decryption keys using the metadata. Further, the central facility determines an access location (e.g., an address) of the decryption key. In some disclosed examples, the access location of the decryption key is an address of a web server of the central facility. The encryption key and the address of the decryption key are synchronized with the service provider. The service provider then encrypts the media using the encryption key. When the encrypted media is presented to a client device, the address of the decryption key is also presented (e.g., in a streaming manifest file). The client device may then request the decryption key via the address of the decryption key. In some disclosed examples, the central facility 170 provides the decryption key to the client device.

In some disclosed examples, streaming media is delivered to the client device using HTTP Live Streaming (HLS) via a HyperText Markup Language version 5 (HTML5) webpage. However, any other past, present, and/or future method of streaming media to the client device may additionally or alternatively be used such as, for example, an HTTP Secure (HTTPS) protocol. Additionally or alternatively, any other past, present, and/or future script, protocol, and/or language may additionally or alternatively be used. The HyperText Markup Language version 5 (HTML5) allows metadata to be included in a timed text track and/or otherwise associated with, for example, a media stream, etc. In some disclosed examples, a client device uses a browser to display media received via HLS. Additionally or alternatively, in some disclosed examples the client device uses a media presenter (e.g., a browser plugin, an app, a framework, an application programming interface (API), etc.) to display media received via HLS.

In some examples illustrated herein, the client device requests the manifest file from a service provider. In some examples illustrated herein, the manifest defines an address of a decryption key that is to be separately requested by the client device. In some examples, the decryption key is hosted by the central facility 170 of the audience measurement entity. However, in other examples, the manifest is hosted by an entity other than the audience measurement entity such as, for example, the service provider 120, an entity that does not deliver the media to the client, etc.

In examples illustrated below, media exposure metrics are monitored by recording requests for decryption key(s). Because encrypted media cannot be decrypted without the decryption key, monitoring requests for the decryption key is a useful indication of whether the media is being presented. In addition, requests for the decryption key may be validated, thereby enabling media access protection. For example, a device requesting a decryption key may not be validated unless a username and/or password are provided. Additionally or alternatively, other factors may be used to determine whether a device requesting the decryption key is validated such as, for example, a location of the device (e.g., is the device located in a distribution region for the media such as, for example, North America, etc.), whether an Internet protocol (IP) address of the device is provided, whether cookie data associated with the user of the device is provided, etc.

Example methods, apparatus, systems, and articles of manufacture disclosed herein involve extracting or collecting metadata (e.g., metadata stored in an ID3 tag, extensible markup language (XML) based metadata, and/or metadata in any other past, present, and/or future format) associated with streaming media transmissions (e.g., streaming audio and/or video) at a client device. In some examples, the metadata identifies one or more of a genre, an artist, a song title, an album name, a transmitting station/server site, etc. In such examples, highly granular (e.g., very detailed) data can be collected. Whereas in the past ratings were largely tied to specific programs or broadcasting stations, example methods, apparatus, systems, and/or articles of manufacture disclosed herein can generate ratings for a genre, an artist, a song, an album/CD, a particular transmitting/server site, etc. in addition to or as an alternative to generating ratings for specific programs, advertisements, media providers, broadcasters, and/or stations.

Example methods, apparatus, systems, and articles of manufacture disclosed herein collect demographic information associated with users of client devices based on identifiers (e.g., an Internet protocol (IP) address, a cookie, a device identifier, etc.) associated with those client devices. Media exposure information may then be generated based on the media metadata and the user demographics to indicate exposure metrics and/or demographic reach metrics for at least one of a genre, an artist, an album name, a transmitting station/server site, media, an advertisement, etc.

In some examples, it is desirable to link demographics to the monitoring information. To address this issue, the audience measurement entity establishes a panel of users who have agreed to provide their demographic information and to have their streaming media activities monitored. When an individual joins the panel, they provide detailed information concerning their identity and demographics (e.g., gender, race, income, home location, occupation, etc.) to the audience measurement entity. The audience measurement entity sets an identifier (e.g., a panelist cookie) on the presentation device that enables the audience measurement entity to identify the panelist whenever the panelist accesses streamed media and/ or requests a decryption key. In particular, each panelist is provided with a media monitor (e.g., a software meter) that enables reporting of access(es) to streamed media to a central facility of the audience measurement entity by requesting and/or logging requests for a decryption key used to decrypt the encrypted streaming media. In the illustrated example, the media monitor transmits and/or logs the identifier along with the request(s) for the decryption key (e.g., in the form of a cookie).

Example methods, apparatus, systems, and articles of manufacture disclosed herein may also be used to generate reports indicative of media exposure metrics on one or more different types of client devices (e.g., personal computers, portable devices, mobile phones, tablets, etc.). For example, an audience measurement entity may generate media exposure metrics based on metadata extracted from the streaming media at the client device and/or similar devices. A report is then generated based on the media exposure to indicate exposure measurements (e.g., for a type of media (e.g., a genre)) using different types of client devices. Thus, for example, reports indicating the popularity of watching, for instance, sports events on certain types of client devices (e.g., mobile devices, tablets, etc.) can be compared to other popularities of watching sports events on other types of client devices (e.g., televisions, personal computers, etc.).

Additionally or alternatively, popularities of different types of media across different device types may be compared. Such different types of media may be, for example, news, movies, television programming, on-demand media, Internet-based media, games, streaming games, advertisements, etc. Such comparisons may be made across any type(s) and/or numbers of devices including, for example, cell phones, smart phones, dedicated portable multimedia playback devices, iPod® devices, tablet computing devices (e.g., an iPad®), standard-definition (SD) televisions, high-definition (HD) televisions, three-dimensional (3D) televisions, stationary computers, portable computers, Internet radios, etc. Any other type(s) and/or number of media and/or devices may be analyzed. The report may also associate the media exposure metrics with demographic segments (e.g., age groups, genders, ethnicities, etc.) corresponding to the user(s) of the client device(s). Additionally or alternatively, the report may associate the media exposure metrics with metric indicators of the popularity of the artist, genre, song, title, etc., across one or more user characteristics selected from one or more demographic segment(s), one or more age group(s), one or more gender(s), and/or any other user characteristic(s).

In some examples, the media exposure metrics are used to determine demographic reach of streaming media, ratings for streaming media, engagement indices for streaming media, user affinities associated with streaming media, broadcast media, and/or any other audience measure metric associated with streaming media and/or locally stored media. In some examples, the media exposure metrics are audience share metrics indicative of percentages of audiences for different device types that accessed the same media. For example, a first percentage of an audience may be exposed to news media via smart phones, while a second percentage of the audience may be exposed to the same news media via tablets.

FIG. 1 is a block diagram of an example system 100 constructed in accordance with the teachings of this disclosure for measuring exposure to streaming media. The example system 100 of FIG. 1 monitors media provided by an example media provider 110 for presentation on an example client device 160 via an example network 150. The example system 100 includes an example service provider 120, an example media presenter 165, and an example central facility 170 of an audience measurement entity. While the illustrated example of FIG. 1 discloses an example implementation of the service provider 120, other example implementations of the service provider 120 may additionally or alternatively be used, such as the example implementations disclosed in co-pending U.S. patent application Ser. No. 13/341,646, which is hereby incorporated by reference herein in its entirety.

The media provider 110 of the illustrated example of FIG. 1 corresponds to any one or more media provider(s) capable of providing media for presentation at the client device 160. The media provided by the media provider(s) 110 can be any type(s) of media, such as audio, video, multimedia, etc. Additionally, the media can correspond to live (e.g., broadcast) media, streaming media, stored media (e.g., on-demand media), etc.

The service provider 120 of the illustrated example of FIG. 1 provides media services to the client device 160 via, for example, web pages including links (e.g., hyperlinks, embedded media, etc.) to media provided by the media provider 110. In the illustrated example, the service provider 120 modifies the media provided by the media provider 110 prior to transmitting the media to the client device 160. In the illustrated example, the service provider 120 includes an example media identifier 125, an example transcoder 130, an example metadata generator 135, an example encryption key synchronizer 137, an example encryption key store 138, an example media encrypter 139, an example media transmitter 140, and an example manifest generator 141.

The media identifier 125 of the illustrated example of FIG. 1 is implemented by a logic circuit such as a processor executing instructions, but it could additionally or alternatively be implemented by an application specific integrated circuit(s) (ASIC(s)), programmable logic device(s) (PLD(s)) and/or field programmable logic device(s) (FPLD(s)), an analog circuit, and/or other circuitry. The media identifier 125 of FIG. 1 extracts metering data (e.g., signatures, watermarks, etc.) from the media obtained from the media provider 110. For example, the media identifier 125 can implement functionality provided by a software development kit (SDK) to extract one or more audio watermarks, one or more video (e.g., image) watermarks, etc., embedded in the audio and/or video of the media obtained from the media provider 110. (For example, the media may include pulse code modulation (PCM) audio data or other types of audio data, uncompressed video/image data, etc.)

The example media identifier 125 of FIG. 1 determines (e.g., derives, decodes, converts, etc.) the metering data (e.g., such as media identifying information, source identifying information, etc.) included in or identified by a watermark embedded in the media and converts this metering data and/or the watermark itself into a text and/or binary format for inclusion in an ID3 tag and/or other data type (e.g., text, binary, etc.). For example, the code/watermark itself may be extracted and inserted as metadata in, for example, a text or binary format in the ID3 tag. Thus, the metadata and/or media-identifying metadata included in the ID3 tag may be a text or binary representation of a code, a watermark, and/or metadata or data identified by a code and/or watermark, etc.

The example transcoder 130 of the illustrated example of FIG. 1 is implemented by a logic circuit such as a processor executing instructions, but could additionally or alternatively be implemented by an analog circuit, ASIC, DSP, FPGA, and/or other circuitry. In some examples, the transcoder 130 and the media identifier 125 are implemented by the same physical processor. In the illustrated example, the transcoder 130 employs any appropriate technique(s) to transcode and/or otherwise process the received media into a form suitable for streaming (e.g., a streaming format). For example, the transcoder 130 of the illustrated example transcodes the media in accordance with MPEG 4 audio/video compression for use via the HLS protocol.

The encryption key synchronizer 137 of the illustrated example of FIG. 1 is implemented by a logic circuit such as a processor executing instructions, but could additionally and/or alternatively be implemented by an analog circuit, ASIC, DSP, FPGA, and/or other circuitry. In some examples, the transcoder 130, the media identifier 125, and/or the encryption key synchronizer 137 are implemented by the same physical processor. In the illustrated example, the encryption key synchronizer 137 transmits metadata identified by the media identifier 125 to the central facility 170. The encryption key synchronizer 137 receives encryption keys and addresses of associated decryption keys from the central facility 170.

The encryption key store 138 may be any device for storing data such as, for example, flash memory, magnetic media, optical media, etc. Furthermore, the data stored in the encryption key store 138 may be in any data format such as, for example, binary data, comma delimited data, tab delimited data, structured query language (SQL) structures, etc. While in the illustrated example the encryption key store 138 is illustrated as a single database, the encryption key store 138 may be implemented by multiple databases. In the illustrated example, the encryption key store 138 stores metadata associated with the media identified by the media identifier 125, an encryption key associated with the media received from the central facility 170, and an address of a decryption key associated with the media received from the central facility 170. However, any other data may additionally or alternatively be stored in the encryption key store 138.

The media encrypter 139 of the illustrated example of FIG. 1 is implemented by a logic circuit such as a processor executing instructions, but could additionally or alternatively be implemented by an analog circuit, ASIC, DSP, FPGA, and/or other circuitry. In some examples, the media identifier 125, the transcoder 130, and/or the encryption key synchronizer 137 are implemented by the same physical processor. In the illustrated example, the media encrypter 139 encrypts the media received from the media provider 110. In the illustrated example, the media encrypter 139 encrypts the media using an Advanced Encryption Standard (AES). However any other past, present, and/or future encryption standard may additionally or alternatively be used. In the illustrated example, the media encrypter 139 encrypts the media using the encryption key received from the central facility 170 and/or stored in the encryption key store 138. However, in some examples, the media encrypter 139 encrypts the media using an encryption key that is based on the metadata identified by the media identifier 125.

The media transmitter 140 of the illustrated example of FIG. 1 is implemented by a logic circuit such as a processor executing instructions, but could additionally or alternatively be implemented by an analog circuit, ASIC, DSP, FPGA, and/or other circuitry. In some examples, the transcoder 130, the media identifier 125, the encryption key synchronizer 137, the media encrypter 139, and/or the media transmitter 140 are implemented by the same physical processor.

The media transmitter 140 employs any appropriate technique(s) to select and/or stream the media to a requesting device, such as the client device 160. For example, the media transmitter 140 of the illustrated example selects media that has been identified by the media identifier 125, transcoded by the transcoder 130 and undergone metadata embedding by the metadata embedder 135. The media transmitter 140 then streams the media to the client device 160 via the network 150 using HLS or any other streaming protocol. In some examples, the media transmitter 140 provides a manifest to the client device. The manifest describes the available encrypted transport streams to the client device. In the illustrated example, the manifest includes the address of the decryption key associated with the media. The address of the decryption key enables the client device to retrieve the decryption key and decrypt the encrypted transport streams.

The manifest generator 141 of the illustrated example of FIG. 1 is implemented by a logic circuit such as a processor executing instructions, but could additionally or alternatively be implemented by an analog circuit, ASIC, DSP, FPGA, and/or other circuitry. In some examples, the transcoder 130, the media identifier 125, the encryption key synchronizer 137, the media encrypter 139, the media transmitter 140, and/or the manifest generator 141 are implemented by the same physical processor. The manifest generator 141 generates a manifest that is provided to a requesting device (e.g., the client device 160) and describes addresses for retrieving the encrypted media and/or the decryption key.

In some examples, the media identifier 125, the transcoder 130, the encryption key synchronizer 137, and/or the media encrypter 139 prepare media for streaming regardless of whether (e.g., prior to) a request is received from the client device 160. In such examples, the already-prepared media is stored in a data store of the service provider 120 (e.g., such as in a flash memory, magnetic media, optical media, etc.). In such examples, the media transmitter 140 prepares a transport stream for streaming the already-prepared media to the client device 160 when a request is received from the client device 160. In other examples, the media identifier 125, the transcoder 130, the encryption key synchronizer 137, and/or the media encrypter 139 prepare the media for streaming in response to a request received from the client device 160.

The example network 150 of the illustrated example is the Internet. Additionally or alternatively, any other network(s) communicatively linking the service provider 120 and the client device such as, for example, a private network, a local area network (LAN), a virtual private network (VPN), etc. may be used. The network 150 may comprise any number of public and/or private networks using any type(s) of networking protocol(s).

The client device 160 of the illustrated example of FIG. 1 is a computing device that is capable of presenting streaming media provided by the media transmitter 140 via the network 150. The client device 160 may be, for example, a tablet, a desktop computer, a laptop computer, a mobile computing device, a television, a smart phone, a mobile phone, an Apple® iPad®, an Apple® iPhone®, an Apple® iPod®, an Android™ computing device, a Palm® webOS® computing device, etc. In the illustrated example, the client device 160 includes a media presenter 165. In the illustrated example, the media presenter 165 is implemented by a media player (e.g., a browser, a local application, etc.) that presents streaming media provided by the media transmitter 140. For example, the media presenter 165 may additionally or alternatively be implemented in Adobe® Flash® (e.g., provided in a SWF file), implemented in hypertext markup language (HTML) version 5 (HTML5), implemented in Google® Chromium®, implemented according to the Open Source Media Framework (OSMF), implemented according to a device or operating system provider's media player application programming interface (API), implemented on a device or operating system provider's media player framework (e.g., the Apple® iOS® MPMoviePlayer software), etc., or any combination thereof. In the illustrated example, the media presenter 165 receives encrypted media and an address of a decryption key from the service provider 120 (e.g., via the manifest). The media presenter 165 of the illustrated example retrieves the decryption key from the specified address (e.g., from a server that does not deliver the media to the client), and decrypts the encrypted media using the decryption key. While a single client device 160 is illustrated, any number and/or type(s) of media presentation devices may be used.

In some examples, a monitor separate from the media presenter 165 (e.g., internal and/or external to the client device 160) logs the requests for the decryption key. In some such examples, the monitor monitors for and/or logs requests made by the media presenter 165. The monitor then stores (e.g., buffers, caches, etc.) the requests before sending the stored requests to a measurement server such as, for example, the central facility 170. In some examples, the monitor does not store (and/or only buffers the requests in a transmission queue) the monitored requests made by the media presenter 165 and instead transmits (e.g., streams) the requests to the measurement server (e.g., the central facility 170) in real time or substantially real time.

The central facility 170 of the illustrated example of FIG. 1 is implemented by a computing device capable of communicating with other devices (e.g., the service provider 120, the client device 160, etc.) via the network 150. In the illustrated example, the central facility 170 comprises one or more servers. However, any other type(s) of computing device(s) may additionally or alternatively be used such as, for example, a desktop computer, an Internet appliance, a laptop, a tablet, etc. In the illustrated example, the central facility 170 is separate from the service provider 120. However, in some examples, the central facility 170 may be included in and/or under the control of the service provider 120.

The central facility 170 of the audience measurement entity (e.g., the Nielsen Company (US) LLC) of the illustrated example of FIG. 1 includes an interface to receive reported metering information contained within and/or received in association with requests for a decryption key from the media presenter 165 of the client device 160 via the network 150. In the illustrated example, the central facility 170 includes an HTTP interface to receive HTTP requests that include the request for a decryption key and/or identifying information. The HTTP requests are sent with the identifying information in their payload (e.g., as a cookie). The requests may not be intended to actually retrieve data or webpage(s), but are instead used as a vehicle to convey the metering information and/or retrieve a decryption key. In some examples, the central facility 170 does not receive the requests for the decryption key(s), but instead receives one or more log(s) indicative of requests for the decryption key(s). In some such examples, the requests for the decryption key(s) may be sent to a location other than the central facility 170 (e.g., an alternate decryption key server 173). The media presenter 165, a monitor (e.g., a monitor internal and/or external to the client device 160), the alternate decryption key server 173, etc. may then transmit one or more log(s) indicative of requests for the decryption key(s) to the central facility 170.

The central facility 170 is provided with software (e.g., a daemon) to extract the metering information (e.g., the identifying information) from the payload of the request(s). Additionally or alternatively, any other method(s) to receive metering information may be used such as, for example, an HTTP Secure protocol (HTTPS), a file transfer protocol (FTP), a secure file transfer protocol (SFTP), an HTTP and/or HTTPS GET request, an HTTP and/or HTTPS POST request, etc. In the illustrated example, the central facility 170 stores and analyzes the metering information received from a plurality of different client devices. For example, the central facility 170 may sort and/or group metering information by media provider 110 (e.g., by grouping all metering data associated with a particular media provider 110). Any other processing of metering information may additionally or alternatively be performed. In some examples, the central facility 170 adds a timestamp to the request upon receipt. Timestamping (e.g., recording a time that an event occurred) enables accurate identification and/or correlation of media that was presented and/or the time that it was presented with the user(s) of the presentation device.

In the illustrated example, the central facility 170 includes an example key store 171. The example key store 171 may be implemented by any device for storing data such as, for example, flash memory, magnetic media, optical media, etc. Furthermore, the data stored in the key store 171 may be in any data format such as, for example, binary data, comma delimited data, tab delimited data, structured query language (SQL) structures, etc. While in the illustrated example the key store 171 is illustrated as a single database, the key store 171 may be implemented by multiple databases. In the illustrated example, the key store 171 stores encryption key(s), decryption key(s), and the address of the decryption key(s) in association with the media.

While in the illustrated example, the central facility 170 receives requests from the client device 160 for decryption key(s), any other server and/or location may receive such requests. For example, an alternate decryption key server 173 that is at a different location than the central facility 170 may receive and/or respond to the requests for the decryption key(s). The example alternate decryption key server 173 may store (e.g., record, log, etc.) requests for decryption key(s) and/or identifying information associated therewith. The stored requests may be transmitted from the alternate decryption key server 173 to the central facility 170 for analysis. In the illustrated example, the stored requests are transmitted to the central facility 170 periodically (e.g., once every hour, once every day, once every week, etc.). However, the stored requests may be transmitted to the central facility 170 a-periodically such as, for example, as requests are received (e.g., streaming), when a certain number of requests are received (e.g., ten requests, one hundred requests, one thousand requests, etc.), etc.

The alternate decryption key server 173 of the illustrated example of FIG. 1 is implemented by a computing device capable of communicating with other devices (e.g., the service provider 120, the client device 160, the central facility 170, etc.) via the network 150. In the illustrated example, the alternate decryption key server 173 comprises one or more servers. However, any other type(s) of computing device(s) may additionally or alternatively be used such as, for example, a desktop computer, an Internet appliance, a laptop, a tablet, etc. In the illustrated example, the alternate decryption key server 173 is separate from the service provider 120. However, in some examples, the alternate decryption key server 173 may be included in and/or under the control of the service provider 120 and/or the central facility 170.

In the illustrated example, the alternate decryption key server 173 includes an example key store 174. The example key store 174 may be any device for storing data such as, for example, flash memory, magnetic media, optical media, etc. Furthermore, the data stored in the key store 174 may be in any data format such as, for example, binary data, comma delimited data, tab delimited data, structured query language (SQL) structures, etc. While in the illustrated example the key store 174 is illustrated as a single database, the key store 174 may be implemented by multiple databases. In the illustrated example, the key store 174 stores decryption key(s) and record(s) of requests for such decryption key(s).

Figure 2:
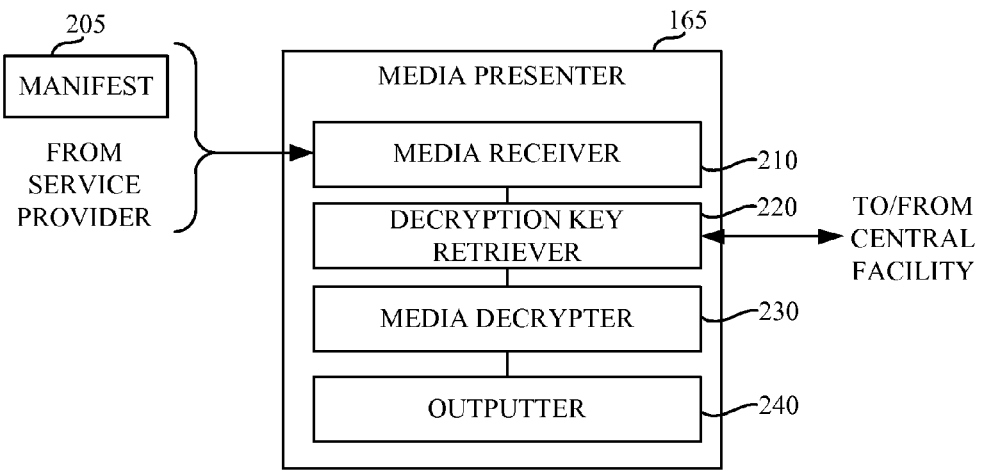
FIG. 2 is a block diagram of an example implementation of the media presenter of FIG. 1.

FIG. 2 is a block diagram of an example implementation of the media presenter 165 of FIG. 1. The media presenter 165 of the illustrated example of FIG. 2 includes an example media receiver 210, an example decryption key retriever 220, an example media decrypter 230, and an example outputter 240.

Figure 4:
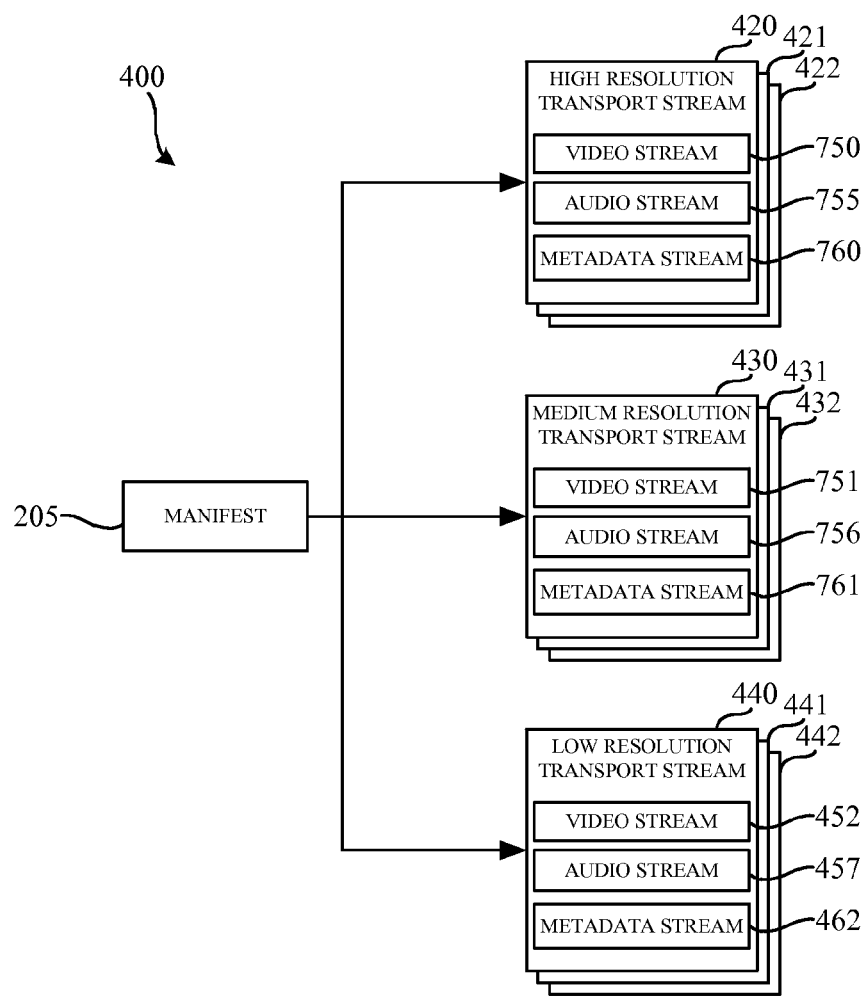
FIG. 4 is a block diagram of an example implementation of an example HLS stream that may be displayed by the example media presenter of FIG. 2.

The media receiver 210 of the illustrated example of FIG. 2 is implemented by a processor executing instructions, but it could additionally or alternatively be implemented by an analog circuit, an ASIC, DSP, FPGA, and/or other circuitry. In the illustrated example, the media receiver 210 receives media from the service provider 120. In the illustrated example, the media is encrypted. However, in some examples, the media may not be encrypted. In the illustrated example, the media receiver 210 receives a manifest 205 indicating one or more Universal Resource Locator(s) (URL (s)) identifying address(es) of the encrypted media and one or more URL(s) indicating address(es) of decryption key(s) associated with the encrypted media. An example manifest 205 is shown in FIGS. 4 and/or 5.

The example decryption key retriever 220 of the illustrated example of FIG. 2 is implemented by a logic circuit such as a processor executing instructions, but it could additionally or alternatively be implemented by an analog circuit, an ASIC, DSP, FPGA, and/or other circuitry. In some examples, the media receiver 210 and/or the decryption key retriever 220 are implemented by the same physical processor. In the illustrated example, the example decryption key retriever 220 requests the decryption key(s) identified in the manifest to decrypt the encrypted media. The decryption key(s) may be requested from any suitable location (e.g., from a server of the service provider 120, from a third party not involved in the delivery of the media such as, the central facility 170 and/or the alternate decryption key server 173, etc.). In the illustrated example, the decryption key retriever 220 provides additional identifying information to the storage location (e.g., the central facility 170) when requesting the decryption key(s) such as, for example, a user identifier, a device identifier, a username, a password, a cookie, an Internet protocol (IP) address, etc.

The media decrypter 230 of the illustrated example of FIG. 2 is implemented by a logic circuit such as a processor executing instructions, but it could additionally or alternatively be implemented by an analog circuit, an ASIC, DSP, FPGA, and/or other circuitry. In some examples, the media receiver 210, the decryption key retriever 220, and/or the media decrypter 230 are implemented by the same physical processor. In the illustrated example, the media decrypter 230 decrypts the media according to an appropriate protocol (e.g., the AES standard) using the decryption key retrieved by the decryption key retriever 220. Any encryption standard may be used such as, for example, a Data Encryption Standard (DES), etc.

The outputter 240 of the illustrated example of FIG. 2 is implemented by a logic circuit such as a processor executing instructions, but it could additionally or alternatively be implemented by an analog circuit, an ASIC, DSP, FPGA, and/or other circuitry. In some examples, the media receiver 210, the decryption key retriever 220, the media decrypter 230, and/or the outputter 240 are implemented by the same physical processor. In the illustrated example, the outputter 240 presents the media decrypted by the media decrypter 230. In the illustrated example, the outputter 240 interacts with a QuickTime® application programming interface (API) to present media via the client device 160. While in the illustrated example, the QuickTime® API is used, any other media presenting framework may additionally or alternatively be employed. For example, the example outputter 240 may interact with an Adobe® Flash® media presentation framework.

Figure 3:
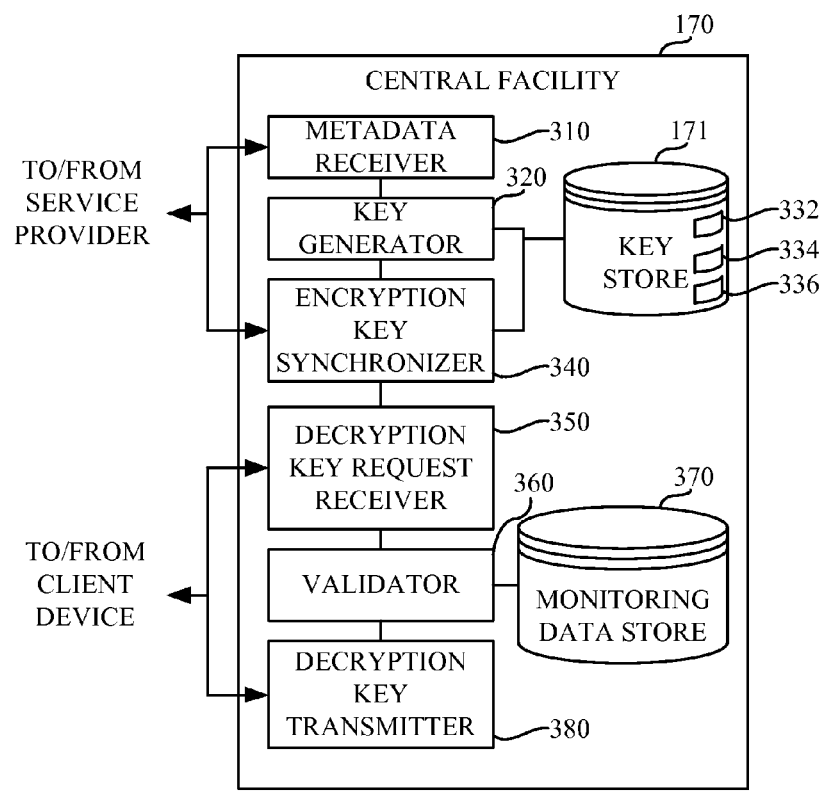
FIG. 3 is a block diagram of an example implementation of the central facility of FIG. 1.

FIG. 3 is a block diagram of an example implementation of the example central facility 170 of FIG. 1. The central facility 170 of the illustrated example of FIG. 3 includes an example metadata receiver 310, an example key generator 320, an example key store 171, an example encryption key synchronizer 340, an example decryption key request receiver 350, an example validator 360, an example monitoring data store 370, and an example decryption key transmitter 380.

The example metadata receiver 310 of the illustrated example of FIG. 3 is implemented by a logic circuit such as a processor executing instructions, but it could additionally or alternatively be implemented by an analog circuit, an ASIC, DSP, FPGA, and/or other circuitry. In the illustrated example, the metadata receiver 310 receives metadata from the service provider 120. The metadata represents and/or is associated with media identified by the media identifier 125 of the service provider 120.

The example key generator 320 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the example metadata receiver 310, and/or the example key generator 320 are implemented by the same physical processor. In the illustrated example, the key generator 320 generates an encryption key 332, a decryption key 334, and a URL identifying an address where the decryption key can be retrieved. In some examples, the encryption key 332 and the decryption key 334 are a-symmetric in that, for example, the encryption key cannot be used to decrypt media that has been encrypted using the encryption key. However, in some other examples, the encryption key 332 and the decryption key 334 are symmetric. In the illustrated, the encryption key 332 and/or the decryption key 334 are generated based on the metadata received by the metadata receiver 310. For example, the metadata may be used as an initialization vector for the encryption keys. However, in some examples, the encryption key 320 and/or the decryption key 334 are generated in another way such as, for example, by random generation, generation based on an identifier of the media, etc. In the illustrated example, the encryption key 332 and the decryption key 334 are different across different pieces of media. However, in some examples, the encryption key 332 and the decryption key 334 are re-used for different pieces of media.

The example key store 171 may be implemented by any device for storing data such as, for example, flash memory, magnetic media, optical media, etc. Furthermore, the data stored in the key store 171 may be in any data format such as, for example, binary data, comma delimited data, tab delimited data, structured query language (SQL) structures, etc. While in the illustrated example the key store 171 is illustrated as a single database, the key store 171 may be implemented by multiple databases. In the illustrated example, the key store 171 stores the encryption key 332, the decryption key 334, and the address of the decryption key 336 in association with the media.

The example encryption key synchronizer 340 of the example of FIG. 3 is implemented by a logic circuit such as a processor executing instructions, but it could additionally or alternatively be implemented by an analog circuit, an ASIC, DSP, FPGA, and/or other circuitry. In some examples, the example metadata receiver 310, the example key generator 320, and/or the example encryption key synchronizer 340 are implemented by the same physical processor. In the illustrated example, the encryption key synchronizer 340 synchronizes the encryption key(s) 332 and the address (es) of the decryption key(s) 336 with the service provider 120. In the illustrated example, synchronization is achieved when the encryption key(s) and address(es) are transmitted by the encryption key synchronizer 340 to the service provider 120 via the network 150. However, any other form of communication may additionally or alternatively be used such as, for example, a private network, a virtual private network, etc. In some examples, multiple service providers 120 may exist. When there are multiple service providers 120, the keys 332, 334 may have already been generated for a particular piece of media identified by one of the service providers 120. In such an example, the encryption key(s) 332 may be transmitted to a service provider that may not have previously received and/or transmitted the associated media to the client device 160. In such an example, the service provider 120 may not need to request the encryption key(s) 332 from the central facility 170 as the encryption key(s) are already known by the service provider 120. In the illustrated example, the address of the decryption key(s) 336 varies based on an identifier of the service provider 120 to, for example, enable identification of the service provider 120 transmitting media to the client device 160. However, in some examples, the address of the decryption key(s) 336 is the same for multiple service providers 120.

The example decryption key request receiver 350 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the example metadata receiver 310, the example key generator 320, the example encryption key synchronizer 340, and/or the example decryption key request receiver 350 are implemented by the same physical processor. In the illustrated example, the decryption key request receiver 350 receives a request for the decryption key 334 associated with media. The request is received when a client device 160 transmits the request to the URL (e.g., an address) identifying the location of the decryption key 336. In the illustrated example, the decryption key request receiver 350 receives identifying information along with the request such as, for example a user identifier, a device identifier, a username, a password, a cookie, an Internet protocol (IP) address, etc. In the illustrated example, the decryption key request receiver 350 stores the identifying information in the monitoring data store 370 along with the request. In some examples, the request is timestamped to identify a time at which the request was received.

The example validator 360 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the example metadata receiver 310, the example key generator 320, the example encryption key synchronizer 340, the example decryption key request receiver 350, and/or the example validator 360 are implemented by the same physical processor. In the illustrated example, the validator 360 validates the request received by the decryption key request receiver 350. In the illustrated example, the validator 360 validates the request to ensure that the client device 160 has appropriate permissions to view the media. In some examples, the validator 360 determines whether a user associated with the client device 160 (identified by a username and/or password) is allowed to receive media from the service provider 120. In some examples, a list of users allowed to receive media from the service provider 120 is stored at the central facility 170.

While in the illustrated example, the validator 360 determines whether the client device 160 has permissions to view the media, the validator 360 may cooperate with any other device, server, database, etc. to determine whether the client device 160 has permissions to view the media. For example, the list of users allowed to receive media from the service provider 120 may be stored at a location other than the central facility 170 such as, for example, at the service provider 120 and/or at a third party such as, for example, the alternate decryption key server 173. The validator 360 may query the service provider 120 and/or any other appropriate location to determine if the requesting client device 160 identified by, for example, a username, a password, a device identifier, etc. has permissions to view the requested media. The validator 360 may then receive a response from, for example, the service provider 120, indicating whether the requesting device has permissions to view the requested media.

In the illustrated example, the validator 360 stores an outcome of the validation in the monitoring data store 370. In the illustrated example, the outcome is stored as a Boolean value (e.g., a true or a false). However, in some examples, other information may additionally or alternatively be stored such as, for example, a reason why validation succeeded or failed, etc.

The example monitoring data store 370 may be any device for storing data such as, for example, flash memory, magnetic media, optical media, etc. Furthermore, the data stored in the monitoring data store 370 may be in any data format such as, for example, binary data, comma delimited data, tab delimited data, structured query language (SQL) structures, etc. While in the illustrated example the storage database is illustrated as a single database, the monitoring data store 370 may be implemented by multiple databases. In some examples, the monitoring data store 370 and the key store 171 are implemented by a same database. In the illustrated example, the monitoring data store 370 stores monitoring information such as, for example, identifiers of received requests for decryption keys, identifying information received along with the requests for decryption keys, timestamps, associations of the requested decryption keys and the media associated therewith, an outcome of the validation performed by the validator 360, etc.

The example decryption key transmitter 380 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the example metadata receiver 310, the example key generator 320, the example encryption key synchronizer 340, the example decryption key request receiver 350, the example validator 360, and/or the example decryption key transmitter 380 are implemented by the same physical processor. In the illustrated example, the decryption key transmitter 380 transmits the decryption key 334 to the client device 160 requesting the decryption key 334. The client device 160 may then decrypt the encrypted media using the decryption key 334 to, for example, present the media to a user.

FIG. 4 is a block diagram of an example implementation of an example HLS stream 400 that may be displayed by the example media presenter 165 of FIG. 2. In the illustrated example of FIG. 4, the HLS stream 400 includes a manifest 205 and three transport streams. The example manifest 205 is a playlist that defines addresses of files to be retrieved and/or presented by the media presenter 165. In the illustrated example, the manifest 205 is an .m3u file that describes the available transport streams to the client device. However, any other past, present, and/or future file format may additionally or alternatively be used such as, for example, an .m3u8 file format. In the illustrated example, the media presenter 165 retrieves the manifest 205 in response to an instruction to display an HLS element.

HLS is an adaptive format, in that, although multiple devices retrieve the same manifest 205, different transport streams may be displayed depending on one or more factors. For example, devices having different bandwidth availabilities (e.g., a high speed Internet connection, a low speed Internet connection, etc.) and/or different display abilities (e.g., a small size screen such as a cellular phone, a medium size screen such as a tablet and/or a laptop computer, a large size screen such as a television, etc.) select an appropriate transport stream for their display and/or bandwidth abilities. In some examples, a cellular phone having a small screen and limited bandwidth uses a low-resolution transport stream. Alternatively, in some examples, a television having a large screen and a high speed Internet connection uses a high-resolution transport stream. As the abilities of the device change (e.g., the device moves from a high-speed Internet connection to a low speed Internet connection) the device may switch to a different transport stream.

In the illustrated example of FIG. 4, a high-resolution transport stream 420, a medium resolution transport stream 430, and a low-resolution transport stream 440 are shown. In the illustrated example, each transport stream 420, 430, and/or 440 represents a portion of the associated media (e.g., five seconds, ten seconds, thirty seconds, one minute, etc.). Accordingly, the high resolution transport stream 420 corresponds to a first portion of the media, a second high resolution transport stream 421 corresponds to a second portion of the media, a third high resolution transport stream 422 corresponds to a third portion of the media. Likewise, the medium resolution transport stream 430 corresponds to the first portion of the media, a second medium resolution transport stream 431 corresponds to the second portion of the media, and a third medium resolution transport stream 432 corresponds to the third portion of the media. In addition, the low resolution transport stream 440 corresponds to the first portion of the media, a second low resolution transport stream 441 corresponds to the second portion of the media, and a third low resolution transport stream 442 corresponds to the third portion of the media. Although three transport streams are shown in the illustrated example of FIG. 4 for each resolution, any number of transport streams representing any number of corresponding portions of the media may additionally or alternatively be used.

In the illustrated example, each transport stream 420, 421, 422, 430, 431, 432, 440, 441, and/or 442 includes a video stream 450, 451, 452, an audio stream 455, 456, 452, and a metadata stream 460, 461, 462. The video stream 450, 451, and/or 452 includes video associated with the media at different resolutions according to the resolution of the transport stream with which the video stream is associated. The audio stream 455, 456, and/or 454 includes audio associated with the media. The metadata stream 460, 461, and/or 462 may include metadata such as, for example, an ID3 tag associated with the media.

Figure 5:
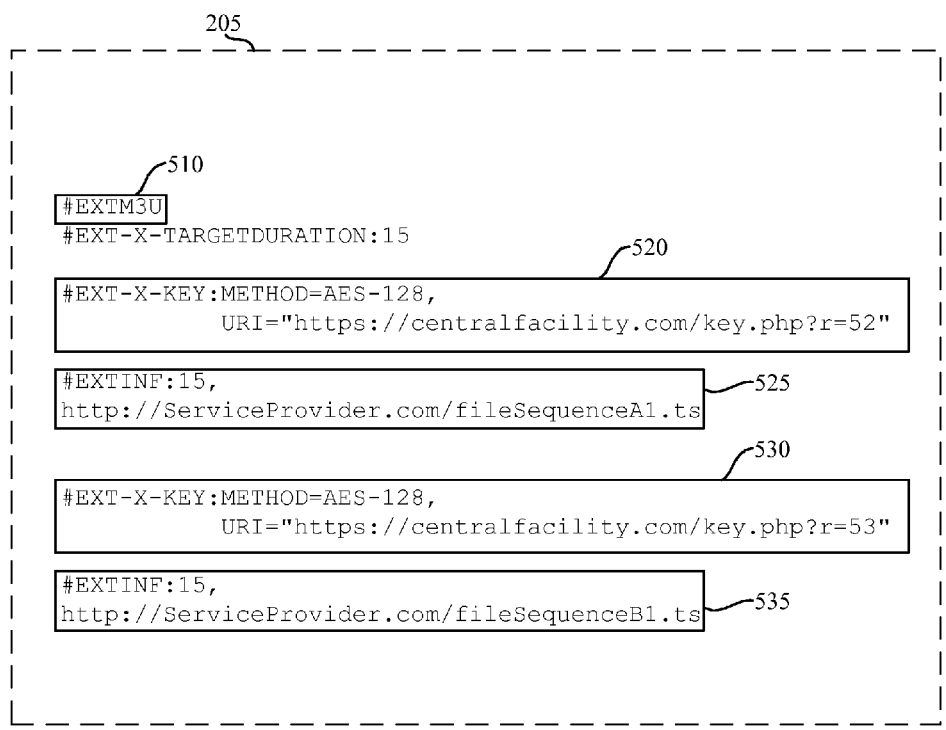
FIG. 5 illustrates an example manifest describing the example HLS stream of FIG. 4 that may be used by the example media presenter of FIG. 2.

FIG. 5 illustrates an example manifest 205 describing the example HLS stream of FIG. 4. The example manifest 205 of FIG. 5 may be generated by the manifest generator 141 of the service provider 120 for use by the example media presenter 165 of FIGS. 1 and/or 2. The example manifest 205 of FIG. 5 includes a format identifier 510. In the illustrated example, the format identifier identifies that the format of the manifest 205 is the m3u format. However, any other format may additionally or alternatively be used.

In the illustrated example, the manifest 205 includes a first decryption key address identifier 520, a first media address identifier 525, a second decryption key address identifier 530, and a second media address identifier 535. The first decryption key address identifier 520 identifies the address of a decryption key for decrypting media segments (e.g., media segments corresponding to the first media address identifier 525). In the illustrated example, the media address identifier 525 is intermediate the first decryption key address identifier 520 and the second decryption key address identifier 530. Because the decryption key address identifiers 520, 530 apply to subsequent media segments, a first media associated with the first media address identifier 525 is decrypted using a first decryption key associated with the first decryption key address identifier 520. A second media associated with the second media address identifier 535 is decrypted using a second decryption key associated with the second decryption key address identifier 530. In some examples, the first encryption key and the second decryption key are the same. However, in some examples, the first encryption key and the second encryption key are different.

The decryption key address identifiers 520, 530 identify that the decryption key is in an Advanced Encryption Standard (AES) 128-bit format. However, any other format may additionally or alternatively be used. The decryption key address identifiers 520, 530 identify the address(es) of the decryption key(s) with universal resource indicators (URIs). However, any other way of identifying the address(es) of the decryption key(s) may additionally or alternatively be used. In the illustrated example, the decryption key address identifiers 520, 530 identify that the decryption keys are to be retrieved from the central facility 170. However, any other location may additionally or alternatively be used such as, for example, the service provider, a third party, etc. In the illustrated example, the URIs indicate that the decryption keys should be retrieved using HTTPS. However any other communication standard may additionally or alternatively be used such as, for example, a file transfer protocol (FTP), HTTP, etc.

The media address identifiers 525, 535 identify addresses of media to be presented by the example media presenter 165. In the illustrated example, the media address identifiers 525, 535 indicate that the media should be retrieved using HTTP. However, any other communication standard may additionally or alternatively be used such as, for example, FTP, HTTPS, etc. In the illustrated example, the media address identifiers 525, 535 indicate that the media segments are to be retrieved from the service provider. However, the media segments identified by the media address identifiers 525, 535 may additionally or alternatively be retrieved from any other location and/or address such as, for example, an advertisement provider, a third party, etc.

While example manners of implementing the service provider 120 of FIG. 1, the example media monitor 165 of FIGS. 1 and/or 2, and/or the example central facility 170 of FIGS. 1 and/or 3 have been illustrated in FIGS. 1, 2, and/or 3, one or more of the elements, processes and/or devices illustrated in FIGS. 1 2, and/or 3 may be combined, divided, re-arranged, omitted, eliminated and/or implemented in any other way. Further, the example media identifier 125, the example transcoder 130, the example encryption key synchronizer 137, the example encryption key store 138, the example media encrypter 139, the example media transmitter 140, the example manifest generator 141, the example service provider 120 of FIG. 1, the example media receiver 210, the example decryption key retriever 220, the example media decrypter 230, the example outputter 240, the example media presenter 165 of FIGS. 1 and/or 2, the example metadata receiver 310, the example key generator 320, the example key store 171, the example encryption key synchronizer 340, the example decryption key request receiver 350, the example validator 260, the example monitoring data store 370, the example decryption key transmitter 380, and/or, the example central facility 170 of FIGS. 1 and/or 3 may be implemented by hardware, software, firmware and/or any combination of hardware, software and/or firmware.

Thus, for example, any of the example media identifier 125, the example transcoder 130, the example encryption key synchronizer 137, the example encryption key store 138, the example media encrypter 139, the example media transmitter 140, the example manifest generator 141, the example service provider 120 of FIG. 1, the example media receiver 210, the example decryption key retriever 220, the example media decrypter 230, the example outputter 240, the example media presenter 165 of FIGS. 1 and/or 2, the example metadata receiver 310, the example key generator 320, the example key store 171, the example encryption key synchronizer 340, the example decryption key request receiver 350, the example validator 260, the example monitoring data store 370, the example decryption key transmitter 380, the example central facility 170 of FIGS. 1 and/or 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example media identifier 125, the example transcoder 130, the example encryption key synchronizer 137, the example encryption key store 138, the example media encrypter 139, the example media transmitter 140, the example manifest generator 141, the example media receiver 210, the example decryption key retriever 220, the example media decrypter 230, the example outputter 240, the example metadata receiver 310, the example key generator 320, the example key store 171, the example encryption key synchronizer 340, the example decryption key request receiver 350, the example validator 260, the example monitoring data store 370, and/or the example decryption key transmitter 380 are hereby expressly defined to include a tangible computer readable medium such as a memory, DVD, CD, Blu-ray, etc. storing the software and/or firmware. Further still, the example media identifier 125, the example transcoder 130, the example encryption key synchronizer 137, the example encryption key store 138, the example media encrypter 139, the example media transmitter 140, the example manifest generator 141, the example service provider 120 of FIG. 1, the example media receiver 210, the example decryption key retriever 220, the example media decrypter 230, the example outputter 240, the example media presenter 165 of FIGS. 1 and/or 2, the example metadata receiver 310, the example key generator 320, the example key store 171, the example encryption key synchronizer 340, the example decryption key request receiver 350, the example validator 260, the example monitoring data store 370, the example decryption key transmitter 380, and/or, the example central facility 170 of FIGS. 1 and/or 3 may include one or more elements, processes and/or devices in addition to, or instead of, those illustrated in FIGS. 1, 2, and/or 3, and/or may include more than one of any or all of the illustrated elements, processes and devices.

Figure 6:
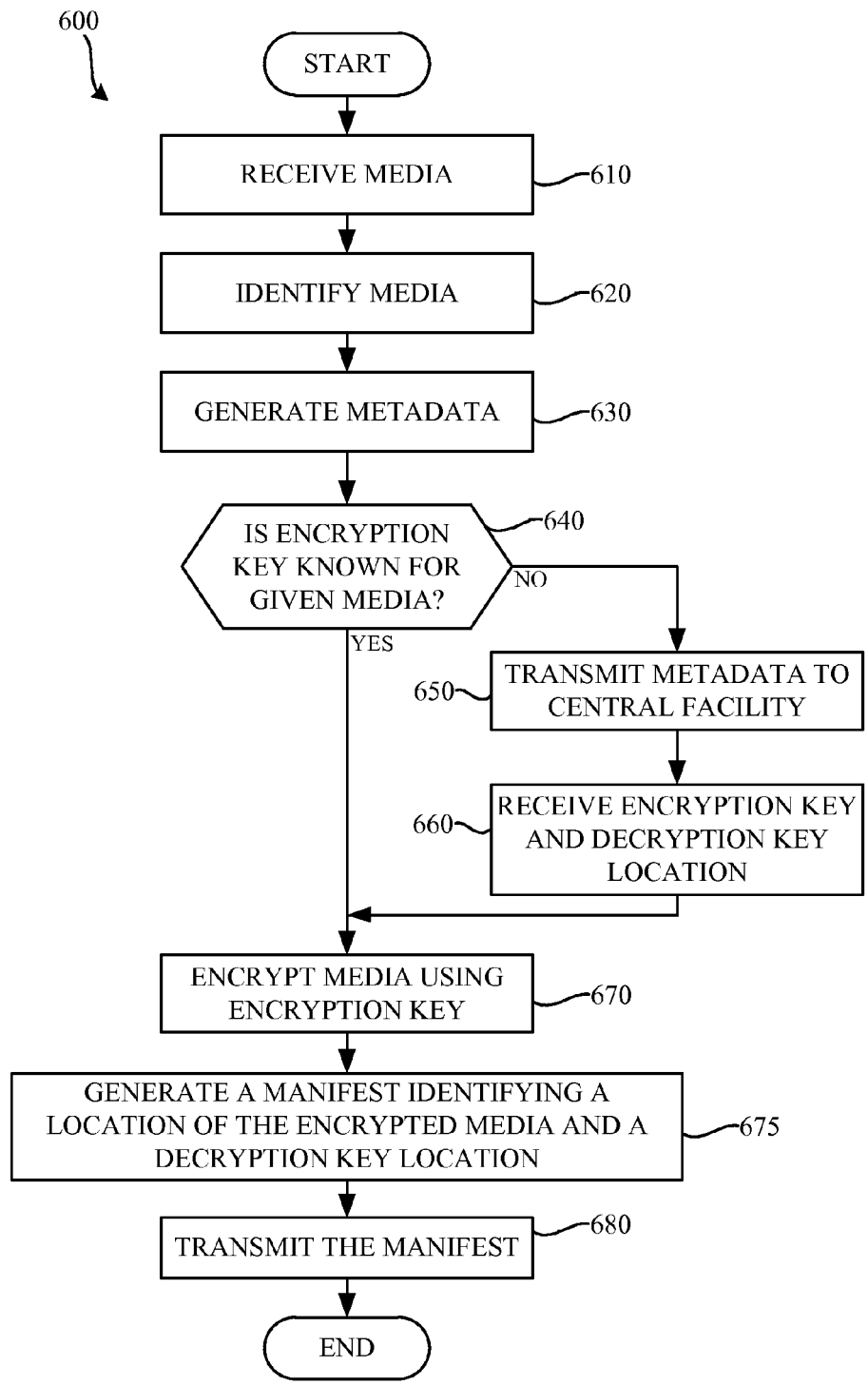
FIG. 6 is a flowchart representative of example machine-readable instructions which may be executed to implement the example service provider of FIG. 1
Figure 7:
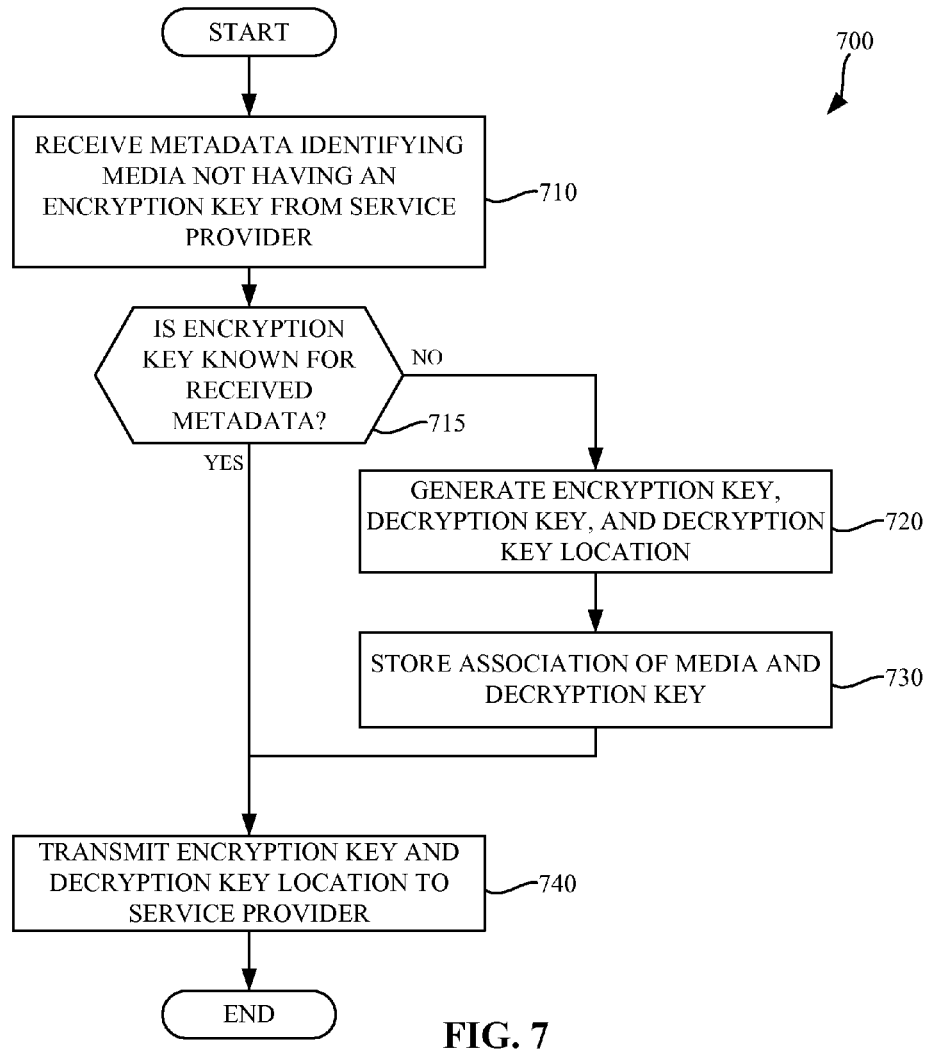
FIG. 7 is a flowchart representative of example machine-readable instructions which may be executed to implement the example central facility of FIGS. 1 and/or 3.
Figure 8:
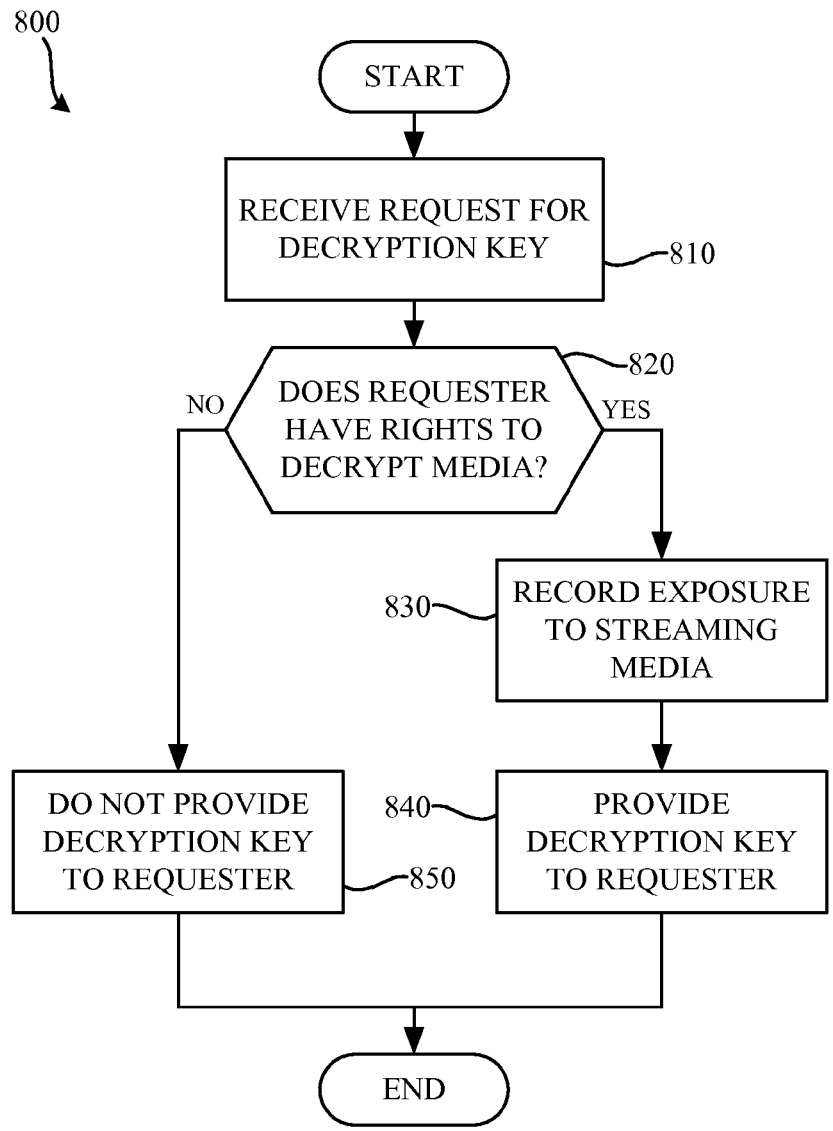
FIG. 8 is a flowchart representative of example machine-readable instructions which may be executed to implement the example central facility of FIGS. 1 and/or 3.

Flowcharts representative of example machine-readable instructions for implementing the example service provider 120 of FIG. 1, the example media presenter 165 of FIGS. 1 and/or 2, and/or the example central facility 170 of FIGS. 1 and/or 3 are shown in FIGS. 6, 7, 8, and/or 9. In these examples, the machine-readable instructions comprise a program for execution by a logic circuit such as the processor 1012 shown in the example processor platform 1000 discussed below in connection with FIG. 10. The program(s) may be embodied in software stored on a tangible computer-readable medium such as a computer readable storage medium (e.g., a CD-ROM, a floppy disk, a hard drive, a digital versatile disk (DVD), a Blu-ray disk, or a memory associated with the processor 1012), but the entire program and/or parts thereof could alternatively be executed by a device other than the processor 1012 and/or embodied in firmware or dedicated hardware. Further, although the example program is described with reference to the flowcharts illustrated in FIGS. 6, 7, 8, and/or 9, many other methods of implementing the example service provider 120 of FIG. 1, the example media presenter 165 of FIGS. 1 and/or 2, and/or the example central facility 170 of FIGS. 1 and/or 3 may alternatively be used. For example, the order of execution of the blocks may be changed, and/or some of the blocks described may be changed, eliminated, or combined.

As mentioned above, the example processes of FIGS. 6, 7, 8, and/or 9 may be implemented using coded instructions (e.g., computer-readable instructions) stored on a tangible computer-readable medium such as a computer readable storage medium (e.g., a hard disk drive, a flash memory, a read-only memory (ROM), a compact disk (CD), a digital versatile disk (DVD), a cache, a random-access memory (RAM)) and/or any other storage media in which information is stored for any duration (e.g., for extended time periods, permanently, brief instances, for temporarily buffering, and/or for caching of the information). As used herein, the term tangible computer-readable medium is expressly defined to include any type of computer-readable storage medium and to exclude propagating signals. Additionally or alternatively, the example processes of FIGS. 6, 7, 8, and/or 9 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 6 is a flowchart representative of example machine-readable instructions 600 which may be executed to implement the example service provider 120 of FIG. 1. Execution of the example machine-readable instructions 600 of FIG. 6 begins with the media identifier 125 of the service provider 120 receiving the media from the media provider 110 (block 610). In the illustrated example, the media is received as it is broadcast (e.g., live). However, in some examples, the media is stored and/or cached by the media identifier 125.

The media identifier 125 of the illustrated example identifies the media (block 620). The media identifier 125 identifies the media by extracting metering data (e.g., codes, signatures, watermarks, etc.) from the media. Based on the extracted metering data, the media identifier 125 generates metadata (block 630). In the illustrated example, the metadata is generated in an ID3 format. However, any other metadata format may additionally or alternatively be used. Further, in the illustrated example, the metadata is generated based on the extracted metering data. However, in some examples, the metadata may be generated by querying an external source using some or all of the extracted metering data.

The encryption key synchronizer 137 determines if an encryption key and/or decryption key address is known for the identified media (block 640). In the illustrated example, the encryption key synchronizer 137 determines if an encryption key and/or decryption key address is known for the identified media by performing a lookup on the encryption key store 138. If the encryption key and/or decryption key are not known, the encryption key synchronizer 137 transmits the identified metadata to the central facility 170 (block 650). The transmitted metadata enables the central facility 170 to identify the corresponding media by comparing the metadata to lookup tables and determine the appropriate encryption key and/or decryption key address. If the media is not known to the central facility 170, the central facility 170 may generate an encryption key, a decryption key, and a decryption key address associated with the media and/or the service provider 120. The encryption key synchronizer 137 then receives the encryption key and/or the decryption key address from the central facility 170 (block 660).

Once the encryption key synchronizer 137 has synchronized the encryption key and/or the decryption key address, the media encrypter 139 encrypts the media using the encryption key (block 670). The manifest generator 141 generates a manifest identifying an address of the encrypted media and the decryption key address (block 675). The media transmitter 140 then transmits the manifest identifying the address of the encrypted media and the decryption key address to the media presenter 165 (block 680). In response, the media presenter 165 of the illustrated example requests the encrypted media in an order specified by the manifest (e.g., in a playlist order). In the illustrated example, the encrypted media is transmitted in the form of an MPEG stream in response to the request for the encrypted media. However, the encrypted media may be transmitted in any other manner.

FIG. 7 is a flowchart representative of example machine-readable instructions 700 which may be executed to implement the example central facility of FIGS. 1 and/or 3. Execution of the example machine-readable instructions 700 of FIG. 7 begins when the metadata receiver 310 receives metadata identifying media that is unknown to the service provider 120 (block 710). As described in connection with FIG. 6, if the encryption key and/or decryption key to be used in association with a particular piece of media are not known at the service provider 120, the encryption key synchronizer 137 transmits the identified metadata to the central facility 170.

The key generator 320 determines if an encryption key is known for the given media based on the received metadata (block 715). In the illustrated example, the key generator 320 determines if an encryption key is known for the given media by performing a lookup on the key store 171. While in the illustrated example, the key generator 320 determines if the encryption key is known, the key generator 320 may additionally or alternatively determine if any other item (e.g., a decryption key, a decryption key address, etc.) is known by performing a lookup on the key store 171. If, for example, the media was already identified by a service provider other than the service provider 120, the key generator 320 may already have generated the encryption key. Further, while in the illustrated example, the key generator determines if the encryption key is known based on the received metadata, the key generator 320 may additionally or alternatively determine if the encryption key is known based on any other information. For example, the key generator 320 may generate (e.g., compute, determine, derive, etc.) an encryption key using the received metadata and determine if the generated encryption key is known.

If the encryption key is not known, the key generator 320 generates (e.g., computes, determines, derives, etc.) an encryption key (e.g., the encryption key 332), a decryption key (e.g., the decryption key 334), and/or a decryption key address (e.g., an address where the decryption key is stored such as the decryption key address 336). In the illustrated example, the encryption key and decryption key are generated based on the received metadata. That is, the received metadata is used as a seed value for generating the encryption and/or decryption keys. In some examples, the key generator 320 generates the encryption key and/or decryption key by looking up the information in a media information database based on the received metadata. In some examples, the key generator 320 generates the encryption key and/or decryption key by using a random seed. The key generator 320 stores the generated encryption key, the generated decryption key, and/or the generated decryption key address in the key store 171 (block 730).

If the encryption key is known (block 715) and/or after the encryption key is generated (block 720) and/or stored (block 730), the encryption key and decryption key address may be transmitted to the service provider 120 (block 740) by the encryption key synchronizer 340. In the illustrated example, the encryption key and decryption key address are transmitted. However, any other value and/or information may be additionally or alternatively be transmitted such as, for example, the received metadata, the decryption key, etc.

FIG. 8 is a flowchart representative of example machine-readable instructions 800 which may be executed to implement the example central facility of FIGS. 1 and/or 3. Execution of the example machine-readable instructions 800 of FIG. 8 begins when the decryption key retriever 220 of the media presenter 165 requests a decryption key from, for example, the central facility 170. In the illustrated example, the request includes information to identify the requested decryption key and the media presenter 165. In some examples, the information identifying the media presenter 165 is a user name and password. However, any other information may additionally or alternatively be used such as, for example, an account number, a panelist identifier, a cookie, etc.

The decryption key request receiver 350 receives the request for the decryption key (block 810). In the illustrated example, the request is received via an HTTP get request. However, any other type of request may additionally or alternatively be used such as, for example, an HTTP post request. The validator 360 determines whether the requester is authorized to decrypt the media associated with the requested decryption key (block 820). In the illustrated example, the validator 360 retrieves an indication of whether the requester has rights to decrypt the media from the monitoring data store 370. However, in some examples, the validator 360 may contact the service provider 120 to determine whether the requester has rights to decrypt the media. For example, the service provider 120 may have more up-to-date records of which clients and/or customers are allowed to decrypt media requested from the service provider 120. In some examples, the validator 360 does not perform a validation and, instead, assumes that all requesters have rights to decrypt the media.

If the requester has rights to decrypt the media, the validator 360 stores a record in the monitoring data store 370 indicating exposure of the requester to the decrypted media (block 830). In the illustrated example, the validator 360 stores the identifying information of the requester and an identifier of the decrypted media. In some examples, the validator 360 stores the identifying information in association with a timestamp. Timestamping the information may enable the audience measurement entity to better monitor what media is presented and when media is presented. The decryption key transmitter 380 then transmits the requested decryption key to the requester (e.g., the media presenter 165) (block 840). If the requester does not have rights to decrypt the media, the decryption key transmitter 380 does not provide the decryption key to the requester (block 850). In some examples, the decryption key transmitter 380 informs the requester that the request was denied.

Figure 9:
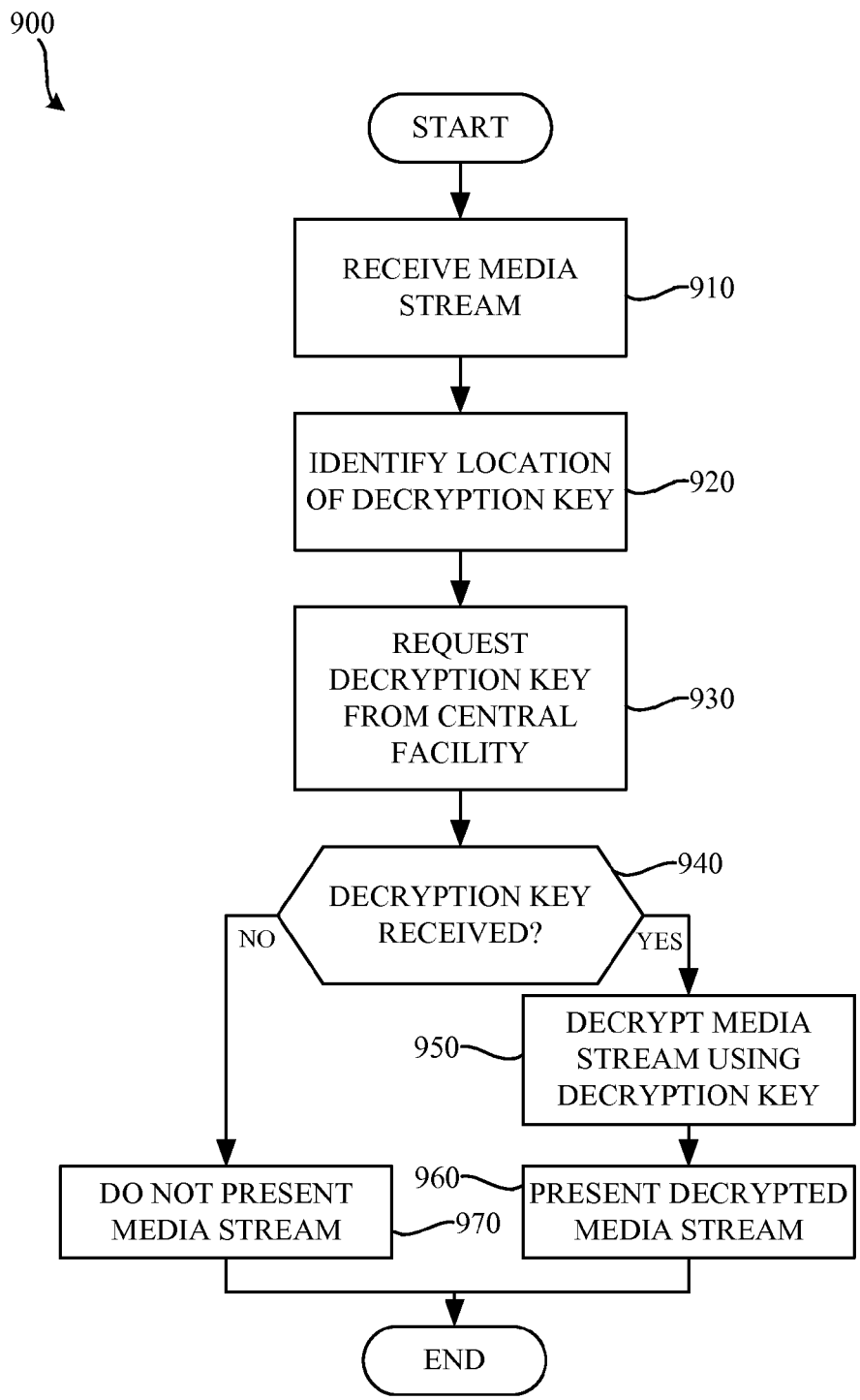
FIG. 9 is a flowchart representative of example machine-readable instructions which may be executed to implement the example media presenter of FIGS. 1 and/or 2.

FIG. 9 is a flowchart representative of example machine-readable instructions 900 which may be executed to implement the example media presenter of FIGS. 1 and/or 2. Execution of the example machine-readable instructions 900 of FIG. 9 begins when the media presenter 165 requests media from the service provider 120. The media receiver 210 of the media presenter 165 receives a requested media stream (block 910). The media receiver 210 of the illustrated examples above receives a manifest (e.g., the manifest 205) that identifies segments of media to be presented. The decryption key retriever 220 of the illustrated examples above inspects the manifest to identify an address of a decryption key associated with the media stream (block 920). The decryption key retriever 220 requests the decryption key from specified address (e.g., an address associated with the central facility 170) (block 930). In the illustrated example, the request includes information to identify the requested decryption key and the media presenter 165 and/or a user of the media presenter 165. In some examples, the information identifying the media presenter 165 and/or the user of the media presenter 165 is a user name and password. However, any other information may additionally or alternatively be used such as, for example, an account number, a panelist identifier, a cookie, etc. The central facility 170 then determines whether a decryption key should be provided as described in connection with FIG. 8.

Returning to FIG. 9, the decryption key retriever 220 of the illustrated example determines whether the requested decryption key is received (block 940). If the decryption key is received, the media decrypter 230 decrypts the media using the received decryption key (block 950). The outputter 240 then presents the decrypted media stream (block 960). If the decryption key is not received, the outputter does not present the media (block 970).

While in examples illustrated herein, the flowcharts of FIGS. 6, 7, 8, and/or 9 are shown as separate processes, in some examples the flowcharts illustrated in FIGS. 6, 7, 8, and/or 9 may be executed together. For example, any or all of the flowcharts of FIGS. 6, 7, 8, and/or 9 may be representative of one or more threads that may be operating in parallel to process multiple requests. Further, any of the flowcharts may be instantiated in multiple threads (e.g., there may be multiple instances of the instructions of FIGS. 6, 7, 8, and/or 9).

Figure 10:
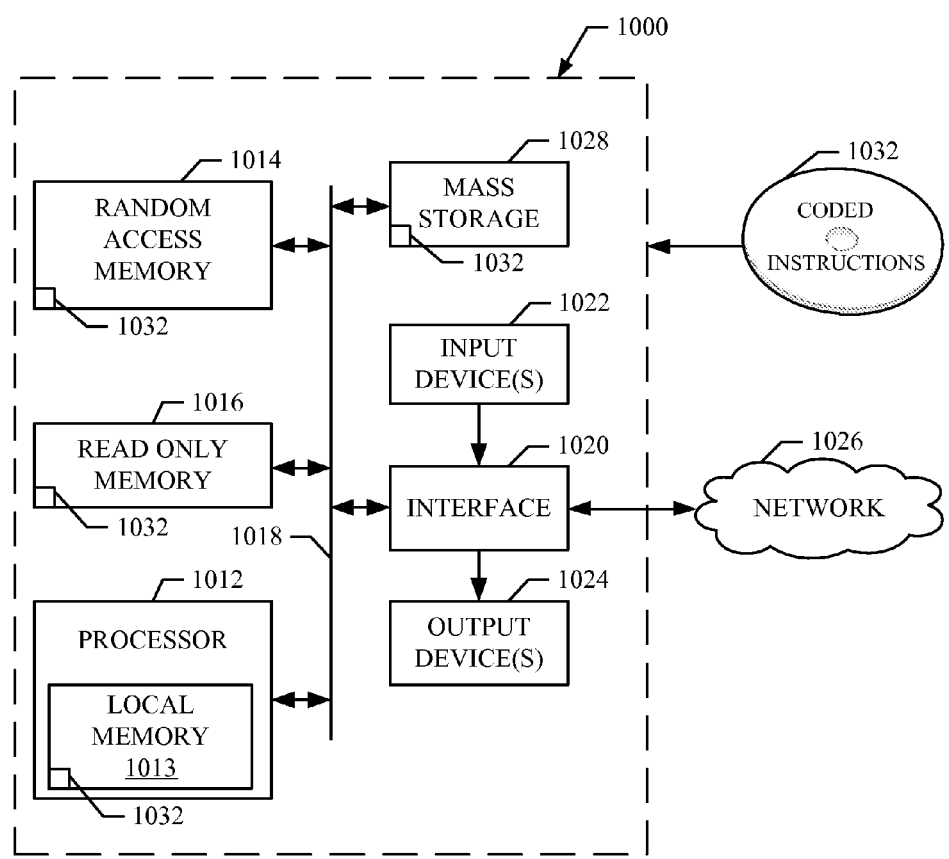
FIG. 10 is a block diagram of an example processor platform capable of executing the example machine-readable instructions of FIG. 6 to implement the example service provider of FIG. 1, capable of executing the example machine-readable instructions of FIGS. 7 and/or 8 to implement the example central facility of FIGS. 1 and/or 3, and/or capable of executing the example machine-readable instructions of FIG. 9 to implement the example media presenter of FIGS. 1 and/or 2.

FIG. 10 is a block diagram of an example processor platform 1000 capable of executing the example machine-readable instructions of FIGS. 6, 7, 8, and/or 9 to implement the example service provider 120 of FIG. 1, the example media monitor 165 of FIGS. 1 and/or 2, and/or the example central facility 170 of FIGS. 1 and/or 3. The example processor platform 1000 can be, for example, a server, a personal computer, a mobile phone (e.g., a cell phone), a tablet, a personal digital assistant (PDA), an Internet appliance, a DVD player, a CD player, a digital video recorder, a Blu-ray player, a gaming console, a personal video recorder, a set top box, or any other type of computing device.

The system 1000 of the instant example includes a processor 1012. For example, the processor 1012 can be implemented by one or more microprocessors or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device (e.g., the encryption key synchronizer 137, the media transmitter 140, the media receiver 210, the decryption key retriever 220, the metadata receiver 310, the encryption key synchronizer 340, the decryption key request receiver 350, the decryption key transmitter 380) such as a modem or network interface card to facilitate exchange of data with external computers via a network 1026 (e.g., an Ethernet connection, a digital subscriber line (DSL), a telephone line, coaxial cable, a cellular telephone system, etc.).

The processor platform 1000 also includes one or more mass storage devices 1028 for storing software and data. Examples of such mass storage devices 1028 include floppy disk drives, hard drive disks, compact disk drives, and digital versatile disk (DVD) drives.

The coded instructions 1032 of FIGS. 6, 7, 8, and/or 9 may be stored in the mass storage device 1028, in the volatile memory 1014, in the non-volatile memory 1016, in the local memory 1013, and/or on a removable storage medium such as a CD or DVD.

Although certain example methods, apparatus, and articles of manufacture have been described herein, the scope of coverage of this patent is not limited thereto. On the contrary, this patent covers all methods, apparatus, and articles of manufacture fairly falling within the scope of the claims of this patent.

What is claimed is:

1. A method of measuring exposure to streaming media, the method comprising:
   identifying, at a service provider, metadata from media;
   converting the media into converted media having a streaming format;
   encrypting the converted media using an encryption key, the encryption key generated based on the identified metadata;
   synchronizing the encryption key and an address of a decryption key with a central facility, the address of the decryption key being based on an identifier of the service provider, the address of the decryption key being an address of a server of the central facility; and
   creating a manifest in association with the converted media, the manifest identifying a location of the encrypted media and the address of the decryption key.

2. The method as described in claim 1, further comprising transmitting the manifest to a requesting device.

3. The method as described in claim 2, further comprising transmitting the encrypted converted media to the requesting device.

4. The method as described in claim 1, wherein the media is obtained from a media provider in response to a request from a requesting device.

5. The method as described in claim 1, wherein the streaming format is a HyperText Transfer Protocol (HTTP) Live Streaming (HLS) format.

6. The method as described in claim 1, further comprising determining if the media is known based on at least one of the encryption key or the metadata.

7. The method as described in claim 6, further comprising requesting the encryption key from the central facility.

8. The method as described in claim 7, further comprising transmitting the metadata to the central facility.

9. The method as described in claim 1, wherein the media comprises live media.

10. The method as described in claim 1, wherein the media is stored media.

11. The method as described in claim 1, wherein the metadata comprises data encoded in a watermark associated with the media.

12. The method as described in claim 11, wherein the watermark is an audio watermark.

13. The method as described in claim 11, wherein the watermark is a video watermark.

14. An apparatus to measure exposure to streaming media, the apparatus comprising:
   a media identifier to generate metadata identifying media based on metering data extracted from the media, the metadata formatted as an ID3 tag;
   a media encrypter to encrypt the media using an encryption key, the encryption key generated based on the metadata;
   a manifest generator to generate a manifest identifying a first location of the encrypted media and a second location of a decryption key, the second location of the decryption key being based on a service provider identifier, the second location of the decryption key corresponding to an address of a server of a central facility;
   a transcoder to transcode the media into a streaming format; and
   an encryption key synchronizer to synchronize the encryption key and the second location of a decryption key with the central facility.

15. The apparatus as described in claim 14, further comprising a media transmitter to transmit the manifest and the encrypted media to a requesting device.

16. The apparatus as described in claim 14, further comprising an encryption key store to store the encryption key and the second location of the decryption key in association with the media.

17. The apparatus as described in claim 14, wherein the streaming format is a HyperText Transfer Protocol (HTTP) Live Streaming (HLS) format.

18. A machine-readable storage medium comprising instructions which, when executed, cause a machine to at least:
   identify metadata from media;
   convert the media into converted media having a streaming format;
   encrypt the converted media using an encryption key, the encryption key generated based on the identified metadata;
   synchronize the encryption key and an address of a decryption key with a central facility, the address of the decryption key being based on a service provider identifier, the address of the decryption key being an address of a server of the central facility; and
   create a manifest in association with the converted media, the manifest identifying a location of the encrypted media and the address of the decryption key.

19. The machine-readable storage medium as described in claim 18, wherein the media comprises live media.

20. The machine-readable storage medium as described in claim 18, wherein the media is stored media.

21. The machine-readable storage medium as described in claim 18, wherein the metadata comprises data encoded in a watermark associated with the media.

22. The machine-readable storage medium as described in claim 21, wherein the watermark is an audio watermark.

23. The machine-readable storage medium as described in claim 21, wherein the watermark is a video watermark.

24. The machine-readable storage medium as described in claim 18, wherein the instructions, when executed, cause the machine to transmit the manifest to a requesting device.

25. The machine-readable storage medium as described in claim 24, wherein the instructions, when executed, cause the machine to transmit the encrypted converted media to the requesting device.

26. The machine-readable storage medium as described in claim 18, wherein the media is obtained from a media provider in response to a request from a requesting device.

27. The machine-readable storage medium as described in claim 18, wherein the streaming format is a HyperText Transfer Protocol (HTTP) Live Streaming (HLS) format.

28. The machine-readable storage medium as described in claim 18, wherein the instructions, when executed, cause the machine to determine if the media is known based on at least one of the encryption key or the metadata.

29. The machine-readable storage medium as described in claim 28, wherein the instructions, when executed, cause the machine to request the encryption key from the central facility.

30. The machine-readable medium as described in claim 18, wherein the instructions, when executed, cause the machine to transmit the manifest to a requesting device.

31. The machine-readable medium as described in claim 30, wherein the instructions, when executed, cause the machine to transmit the encrypted converted media to the requesting device.

32. A machine-readable storage medium comprising instructions which, when executed, cause a machine to at least:
   identify metadata from media, the metadata formatted as an ID3 tag;
   convert the media into converted media having a streaming format;
   encrypt the converted media using an encryption key, the encryption key generated based on the identified metadata;
   synchronize the encryption key and an address of a decryption key with a central facility, the address of the decryption key being based on a service provider identifier, the address of the decryption key being an address of a server of the central facility; and create a manifest in association with the converted media, the manifest identifying a location of the encrypted media and the address of the decryption key.

33. The machine-readable storage medium as described in claim 32, wherein the instructions, when executed, cause the machine to transmit the metadata to the central facility.

34. A method of measuring exposure to streaming media, the method comprising:
   identifying, at a service provider, metadata from media, the metadata formatted as an ID3 tag;
   converting the media into converted media having a streaming format;
   encrypting the converted media using an encryption key, the encryption key generated based on the identified metadata;
   synchronizing the encryption key and an address of a decryption key with a central facility, the address of the decryption key being based on an identifier of the service provider, the address of the decryption key being an address of a server of the central facility; and
   creating a manifest in association with the converted media, the manifest identifying a location of the encrypted media and the address of the decryption key.

\* \* \* \* \*